(12) United States Patent
Khairallah et al.

(10) Patent No.: US 8,061,499 B2
(45) Date of Patent: Nov. 22, 2011

(54) METHOD AND APPARATUS FOR SECURING A MOVABLE ITEM TO A STRUCTURE

(75) Inventors: Charles Ibrahim Khairallah, Montreal (CA); Michel Dallaire, Montreal (CA)

(73) Assignee: Societe de Velo En Libre-Service, Lachine (CA)

( * ) Notice: Subject to any disclaimer, the term of this patent is extended or adjusted under 35 U.S.C. 154(b) by 189 days.

(21) Appl. No.: 12/417,108

(22) Filed: Apr. 2, 2009

(65) Prior Publication Data
US 2009/0266673 A1 Oct. 29, 2009

Related U.S. Application Data

(60) Provisional application No. 61/047,162, filed on Apr. 23, 2008.

(51) Int. Cl.
*G07F 7/00* (2006.01)
(52) U.S. Cl. ............. 194/211; 70/233; 70/234; 70/262; 340/432; 211/5; 211/17; 248/551
(58) Field of Classification Search .................. 194/205, 194/210–213, 904; 340/5.6, 432; 211/5, 211/13.1, 17–22; 248/551–553; 70/233–236, 70/262–265
See application file for complete search history.

(56) References Cited

U.S. PATENT DOCUMENTS

| | | | |
|---|---|---|---|
| 5,323,915 A | 6/1994 | Fortune, Sr. et al. | |
| 5,611,638 A * | 3/1997 | Dorr et al. ...................... | 403/327 |
| 5,841,351 A * | 11/1998 | Rey ................................ | 340/432 |
| 5,917,407 A | 6/1999 | Squire et al. | |
| 6,384,717 B1 | 5/2002 | DeVolpi | |
| 7,434,674 B1 | 10/2008 | Bain | |
| 7,748,511 B1 * | 7/2010 | Maher ........................... | 194/205 |
| 2005/0044908 A1 * | 3/2005 | Min ................................ | 70/276 |
| 2006/0283219 A1 * | 12/2006 | Bendz et al. .................... | 70/431 |
| 2007/0220933 A1 | 9/2007 | Gagosz et al. | |
| 2008/0018440 A1 | 1/2008 | Aulbers et al. | |
| 2008/0297108 A1 | 12/2008 | Le Gars | |
| 2009/0201127 A1 | 8/2009 | Stobbe et al. | |
| 2009/0240575 A1 | 9/2009 | Bettez et al. | |
| 2010/0228405 A1 * | 9/2010 | Morgal et al. .................. | 701/2 |

FOREIGN PATENT DOCUMENTS
EP 0985596 3/2000
(Continued)

OTHER PUBLICATIONS

Benedict, Building an Automated Community Bike Program Project Summary, Hampshire College Division III Project, http://redjar.org/jared/projects/communitybike/summary/, May 5, 2002, pp. 13-15.

*Primary Examiner* — Jeffrey Shapiro
(74) *Attorney, Agent, or Firm* — Pearl Cohen Zedek Latzer, LLP

(57) ABSTRACT

An electronic lock for removably securing a movable item to a structure, the electronic lock comprising first and second complementary cooperating connecting members, each being fixedly mounted to a respective one of the movable item and the structure and being engageable together in a lockable position; and a securing assembly for securing the first and second connecting members together when engaged in the lockable position, the securing assembly comprising a movable locking member operatively associated to the first connecting member, a locking aperture defined in the second connecting member, the locking aperture being adapted for receiving the movable locking member when the connecting members are engaged together in the lockable position; an actuator operatively coupled to the movable locking member for actuating the movable locking member between an unlocked position enabling disengagement of the first and second connecting members and a locked position wherein the movable locking member engages the locking aperture, and electronic control means for controlling selective actuation of the movable locking member.

37 Claims, 21 Drawing Sheets

FOREIGN PATENT DOCUMENTS

| | | |
|---|---|---|
| EP | 2093718 | 8/2009 |
| FR | 2837460 | 9/2003 |
| GB | 2327069 | 1/1999 |
| JP | 2008137640 | 6/2008 |
| JP | 2008191922 | 8/2008 |
| KR | 20090091841 | 8/2009 |
| WO | 9809254 | 3/1998 |
| WO | 0154080 | 7/2001 |
| WO | 2005001781 | 1/2005 |
| WO | 2006021650 | 3/2006 |
| WO | 2006120328 | 11/2006 |
| WO | 2008157443 | 12/2008 |
| WO | 2009080566 | 7/2009 |

* cited by examiner

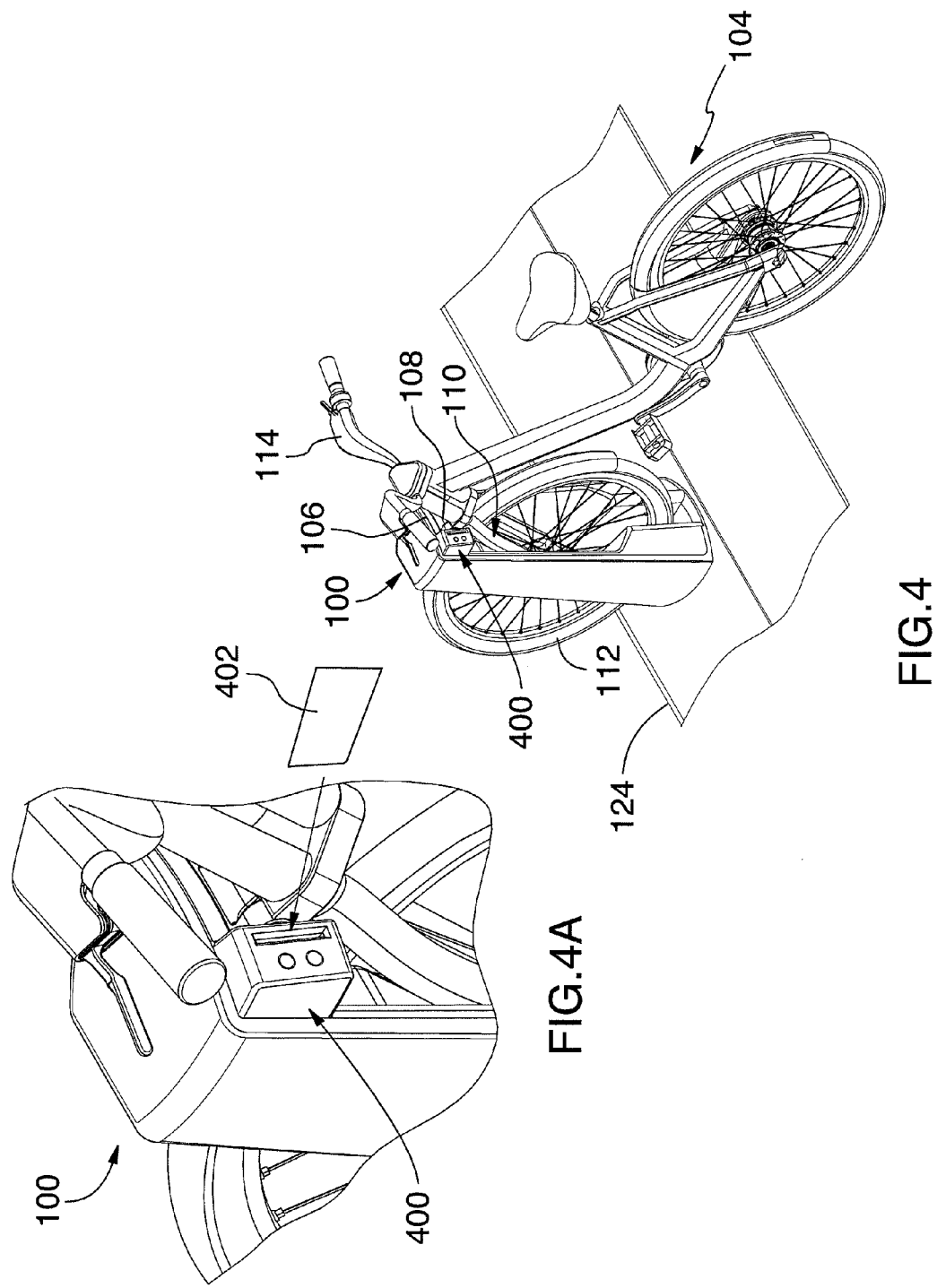

METHOD AND APPARATUS FOR SECURING A MOVABLE ITEM TO A STRUCTURE

CROSS REFERENCE TO RELATED APPLICATION

The present application claims priority from U.S. provisional patent application Ser. No. 61/047,162 filed Apr. 23, 2008, the specification of which is herein incorporated by reference.

FIELD OF THE INVENTION

The invention relates to locking systems. More precisely, the invention pertains to an electronic lock for securing a movable item to a structure and an associated method.

BACKGROUND OF THE INVENTION

Securing a moveable item to a structure is of great interest for various applications. For instance, it may be desirable to secure a vehicle to a fixed structure. This may be particularly advantageous in applications where the vehicle is to be rented for a given amount of time.

More specifically, there has been in recent years a rise in the popularity of automated rental systems for vehicles such as bicycles for example. Such a system generally comprises an automated rental station from which a user may rent a bicycle for a given amount of time.

In such a system, a bicycle to be rented is generally removably secured to a bicycle rack by means of a locking mechanism. A user may selectively unsecure and secure again the bicycle from the bicycle rack in certain circumstances, for instance after paying a given fee and/or providing a personal identification code.

Such rental systems generally comprise a plurality of rental stations located in different public locations, making them likely targets of acts of vandalism from malevolent individuals. Their robustness is thus an important element of a successful rental system.

For example, U.S. Pat. No. 5,917,407, granted to Squire, discloses an automated bicycle renting station wherein the bicycle rack comprises a locking mechanism having a hook or latch member. This hook or latch member is designed to selectively pivot around an axle to engage a rod or a keeper mounted on the bicycle to be secured, thereby effectively securing the bicycle to the renting station.

Such a station may be subject to vandalism. Indeed, a malicious person may tug at the bicycle engaged in the renting station, using the latch as a lever and the axle as a pivot point to bend the latch out of shape or damage the keeper and free the bicycle from the renting station without paying the given fee.

Other locking systems for bicycles have also been proposed in the art. However, such systems are still prone to property damage and theft of bicycles and may thus cause great financial harm to operators of such bicycle renting systems.

Moreover, in some bicycle rental systems, unsecuring a bicycle from a bicycle rental station involves lifting the bicycle or otherwise manipulating the bicycle such that a great physical effort is required from a user of the bicycle rental system. This activity is inconvenient for the user and may lead to injuries.

Furthermore, in some bicycle rental systems, the task of guiding the bicycle towards the bicycle rack for the purpose of securing the bicycle to the bicycle rack may be arduous and inconvenient for a user.

There is therefore a need for a method and an apparatus that will overcome at least one of the above mentioned drawbacks.

BRIEF SUMMARY

There is provided an electronic lock for removably securing a movable item to a structure, the electronic lock comprising first and second complementary cooperating connecting members, each being fixedly mounted to a respective one of the movable item and the structure and being engageable together in a lockable position, and a securing assembly for securing the first and second connecting members together when engaged in the lockable position, the securing assembly comprising a movable locking member operatively associated to the first connecting member, a locking aperture defined in the second connecting member, the locking aperture being adapted for receiving the movable locking member when the connecting members are engaged together in the lockable position, an actuator operatively coupled to the movable locking member for actuating the movable locking member between an unlocked position enabling disengagement of the first and second connecting members and a locked position wherein the movable locking member engages the locking aperture and electronic control means operatively coupled to the actuator for controlling selective actuation of the movable locking member from the unlocked position to the locked position and from the locked position to the unlocked position when the connecting members are engaged together in the lockable position.

In one embodiment, the first connecting member comprises a female connector mounted to the structure and the second connecting member comprises a corresponding complementary male connector mounted to the movable item.

In another embodiment, the second connecting member comprises a male connector having a front tapered portion, the tapered portion comprising two opposed side surfaces converging towards each other and a bottom surface, the first connecting member comprising a female connector having a recess adapted for receiving the front tapered portion therein, the recess comprising a corresponding tapered portion having two opposed inner side walls converging towards each other and two opposed sitting members projecting inwards the recess and adapted for slidably receiving thereon the tapered portion of the male connector.

In a further embodiment, each of the two opposed side surfaces and the bottom surface of the front tapered portion of the male connector comprises a planar surface.

In another embodiment, the two opposed side surfaces of the front tapered portion of the male connector define a V-shape and the corresponding inner side walls of the tapered portion of the recess of the female connector define a complementary V-shape adapted to snuggly receive the front tapered portion of the male connector.

In yet another embodiment, each of the two opposed side surfaces of the front tapered portion of the male connector comprises a substantially vertical planar surface and each of the two opposed inner side walls of the tapered portion of the recess of the female connector comprises a substantially vertical planar surface.

In yet another embodiment, the second connecting member comprises a locking finger extending downwardly from the front tapered portion, the locking aperture being provided on the locking finger.

In a further embodiment, the recess of the female connector further comprises two opposed lower inner side walls converging towards each other and defining a finger channel adapted for receiving the locking finger therein.

In one embodiment, the male connector further comprises a back portion and a hinge extending between the front tapered portion and the back portion for enabling a jointed coupling therebetween.

In one embodiment, the electronic lock further comprises holding means adapted for cooperating with each of the connecting members for temporarily holding the connecting members together in the lockable position once engaged therein.

In a further embodiment, the holding means comprise a pair of two opposed biased elements mounted to a respective one of the first and second connecting members, each of the biased elements having a resting position wherein the element is urged outwardly and protrudes from the corresponding connecting member, the holding means further comprising a pair of corresponding cooperating opposed receiving recesses mounted to the remaining connecting member, each of the receiving recesses being adapted to receive therein a corresponding biased element when the first and second connecting members are engaged in the lockable position, thereby holding the connecting members together in the lockable position.

In another further embodiment, each of the biased elements comprises a ball and a ball spring mounted in a ball housing, each of the receiving recesses comprising a corresponding spherical portion.

In yet another further embodiment, each of the biased elements is mounted on the connecting member mounted to the structure and each of the receiving recesses is mounted on the connecting member mounted to the movable item.

In yet a further embodiment, the connecting member mounted to the structure comprises a female connector and the connecting member mounted to the movable item comprises a male connector.

In one embodiment, the securing assembly comprises position detecting means mounted to one of the first and second connecting members for detecting a positioning of the first and second connecting members in the lockable position.

In another embodiment, the securing assembly comprises position detecting means mounted to the female connector for detecting a positioning of the first and second connecting members in the lockable position, the position detecting means being adapted for detecting a positioning of the locking finger in the finger channel.

In one embodiment, the securing assembly further comprises position detecting means mounted to one of the first and second connecting members for detecting a positioning of the first and second connecting member in the lockable position, the electronic control means being adapted for selectively actuating the actuator to move the movable locking member from the unlocked position to the locked position upon detection of the positioning of the first and second connecting member in the lockable position.

In another embodiment, the securing assembly further comprises position detecting means mounted to one of the first and second connecting members for detecting a positioning of the first and second connecting member in the lockable position, an identification tag associated with the movable item and an identification reader for identifying the identification tag and the associated movable item when the first and second connectors are engaged in the lockable position.

In a further embodiment, the electronic control means are adapted for selectively actuating the actuator to move the movable locking member from the unlocked position to the locked position upon detection of the positioning of the first and second connecting members in the lockable position and identification of the associated movable item.

In yet a further embodiment, the identification tag comprises an RFID tag and the identification reader comprises an RFID reader mounted to the structure.

In one embodiment, the electronic control means comprise unsecuring means for enabling an actuating of the movable locking member from the locked position to the unlocked position, the unsecuring means being selected from a group consisting of a card reader adapted for receiving a corresponding user card, a keypad adapted for receiving a user code and a bar code reader adapted for reading a corresponding bar code.

In another embodiment, the movable locking member comprises an elongated member axially translatable between the unlocked position and the locked position, the locking member being engaged at both ends in the first connecting member through the locking aperture when in the locked position.

In a further embodiment, the actuator comprises a motor and a shaft driven by the motor, the shaft being attached to the movable locking member for driving the movable locking member between the unlocked position and the locked position.

In yet a further embodiment, the securing assembly further comprises shaft position detecting means for monitoring a position of the shaft to thereby monitor a position of the movable locking member.

In yet a further embodiment, the shaft position detecting means comprise an optical detector and a mechanical detector, each of the detectors being adapted for detecting the position of the shaft and an associated position of the movable locking member in the locked position.

In one embodiment, the movable item comprises a bicycle and the structure comprises a bicycle rack.

In a further embodiment, the bicycle rack is a part of a bicycle rental station.

In another further embodiment, the connecting member mounted on the bicycle comprises attaching means for fixedly attaching the connecting member to a fork of the bicycle.

In yet a further embodiment, the attaching means comprise a pair of cylindrical holes extending through the connecting member mounted on the bicycle, the pair of cylindrical holes being adapted to fixedly receive the fork of the bicycle therein.

In one embodiment, the movable item comprises a vehicle selected from a group consisting of a stroller, a wheelchair, an all-terrain vehicle, a scooter and a boat.

According to one embodiment, there is provided an electronic lock for removably securing a movable item to a structure, the electronic lock comprising an elongated male connector fixedly mounted to the movable item and comprising a locking aperture, a female connector fixedly mounted to the structure and adapted for removably receiving therein the elongated male connector and a securing assembly associated to the female connector, the securing assembly comprising a movable locking member displaceable between an unlocked position for allowing the female connector to receive therein the elongated male connector and a locked position, an actuator for causing displacement of the locking member between the unlocked position and the locked position and electronic control means coupled to the actuator for controlling displacement of the locking member between the unlocked position and the locked position, wherein when the elongated male connector is received in the female connector, the electronic control means controls the actuator for causing the locking member to displace towards the locked position and to engage the locking aperture, thereby securing the elongated male connector in the female connector.

According to another aspect, there is provided a method for removably securing a movable item to a structure.

Accordingly, the method comprises providing an electronic lock for removably securing the movable item to the structure, the electronic lock comprising first and second complementary cooperating connecting members, each being fixedly mounted to a respective one of the movable item and the structure and being engageable together in a lockable position, and a securing assembly for securing the first and second connecting members together when engaged in the lockable position, the securing assembly comprising a movable locking member operatively associated to the first connecting member, a locking aperture defined in the second connecting member, the locking aperture being adapted for receiving the movable locking member when the connecting members are engaged together in the lockable position, an actuator operatively coupled to the movable locking member for actuating the movable locking member between an unlocked position enabling disengagement of the first and second connecting members and a locked position wherein the movable locking member engages the locking aperture and electronic control means operatively coupled to the actuator for controlling selective actuation of the movable locking member from the unlocked position to the locked position and from the locked position to the unlocked position when the connecting members are engaged together in the lockable position; engaging the first and second connecting members together in the lockable position and actuating the locking member to the locked position so that the locking member engages the locking aperture, thereby securing the movable item to the structure.

In one embodiment, the method further comprises monitoring a positioning of the first and second connecting members in the lockable position before actuating the locking member.

In another embodiment, the method further comprises identifying the movable item before actuating the locking member.

In yet another embodiment, engaging the first and second connecting members together in the lockable position comprises guiding the connecting member mounted to the movable item towards the lockable position.

In yet another embodiment, engaging the first and second connecting members together in the lockable position comprises holding the first and second connecting members engaged in the lockable position.

In yet another embodiment, the method further comprises, before actuating the locking member, detecting a positioning of the first and second connecting members in the lockable position and identifying the movable item to provide an identification thereof, wherein, in the actuating, the locking member is actuated to the locked position upon detection of the positioning of the first and second connecting members in the lockable position and the identification of the movable item.

In a further embodiment, identifying comprises a radio-frequency identification.

In one embodiment, the method further comprises requesting a user identification and actuating the locking member to the unlocked position for unsecuring the movable item upon reception of the user identification.

In another embodiment, the movable item comprises a bicycle and the structure comprises a bicycle rack.

According to another aspect, there is provided a kit for removably securing a movable item to a structure.

Accordingly, the kit comprises first and second complementary cooperating connecting members, each being fixedly mountable to a respective one of the movable item and the structure and being engageable together in a lockable position, and a securing assembly for securing the first and second connecting members together when engaged in the lockable position, the securing assembly comprising a movable locking member operatively associatable to the first connecting member, a locking aperture defined in the second connecting member, the locking aperture being adapted for receiving the movable locking member when the connecting members are engaged together in the lockable position, an actuator operatively couplable to the movable locking member for actuating the movable locking member between an unlocked position enabling disengagement of the first and second connecting members and a locked position wherein the movable locking member engages the locking aperture and electronic control means operatively couplable to the actuator for controlling selective actuation of the movable locking member from the unlocked position to the locked position and from the locked position to the unlocked position when the connecting members are engaged together in the lockable position.

BRIEF DESCRIPTION OF THE DRAWINGS

In order that the invention may be readily understood, embodiments of the invention are illustrated by way of example in the accompanying drawings.

FIG. 4 is a rear perspective view of the bicycle secured to the bicycle rack using the electronic lock shown in FIG. 1.

FIG. 4A is an enlarged view of the electronic lock shown in FIG. 4.

Further details of the invention and its advantages will be apparent from the detailed description included below.

DETAILED DESCRIPTION

In the following description of the embodiments, references to the accompanying drawings are by way of illustration of an example by which the invention may be practiced. It will be understood that other embodiments may be made without departing from the scope of the invention disclosed.

The invention provides an electronic lock for securing a movable item to a structure. As it will be more clearly understood upon reading of the present description, the electronic lock may advantageously be used in a great variety of applications, such as for example in a vehicle rental system such as a bicycle rental system. The skilled addressee will however appreciate that many other applications may be considered, as it will be more detailed thereinafter.

In the following description of the illustrated embodiments, the movable item comprises a bicycle and the structure comprises a bicycle rack. The bicycle rack is part of a bicycle renting station and is fixedly mounted thereto. It will be appreciated that an operator of such a station may want to control rentals of bicycles to be rented and returns of rented bicycles. Such a station would thus greatly benefit from having means to removably secure a bicycle to be rented to the bicycle rack.

Figure 1:
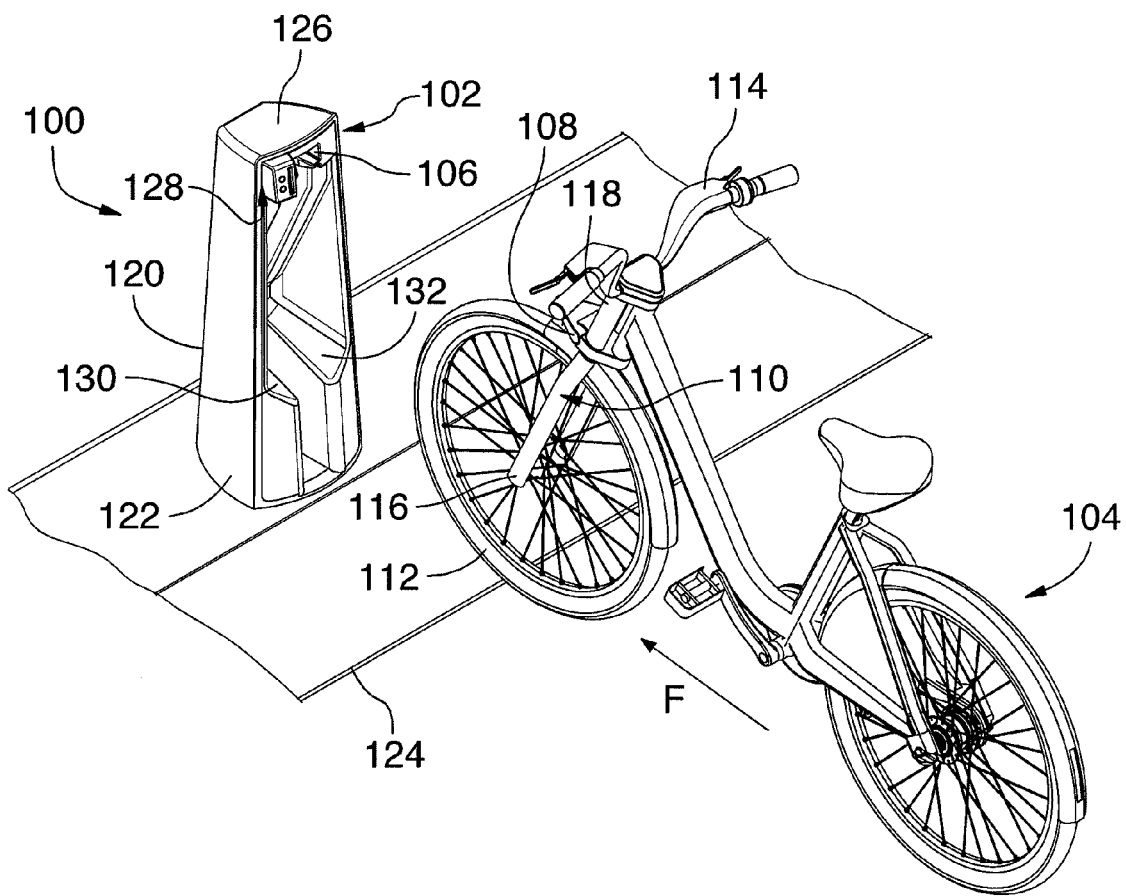
FIG. 1 is a rear perspective view of a bicycle rack having an electronic lock mounted thereon in accordance with one embodiment, with a bicycle removed from the bicycle rack.
Figure 2:
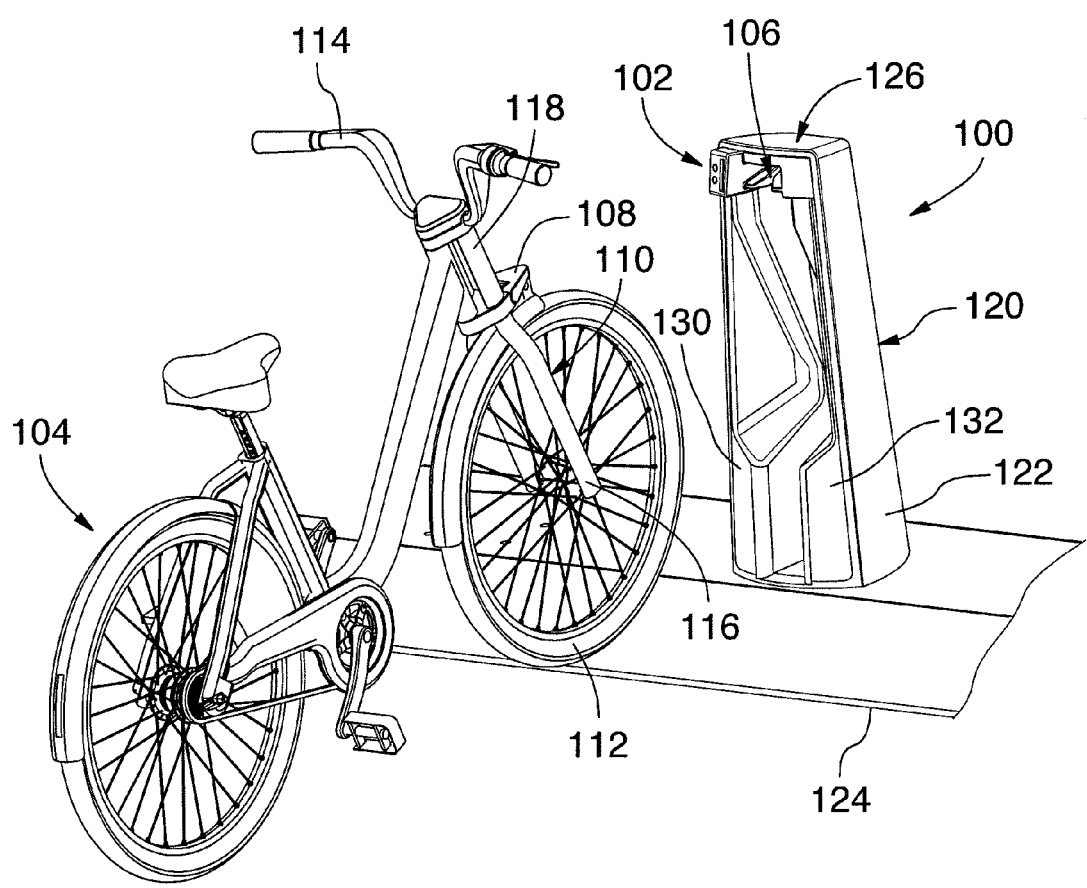
FIG. 2 is another rear perspective view of the bicycle rack shown in FIG. 1.
Figure 3:
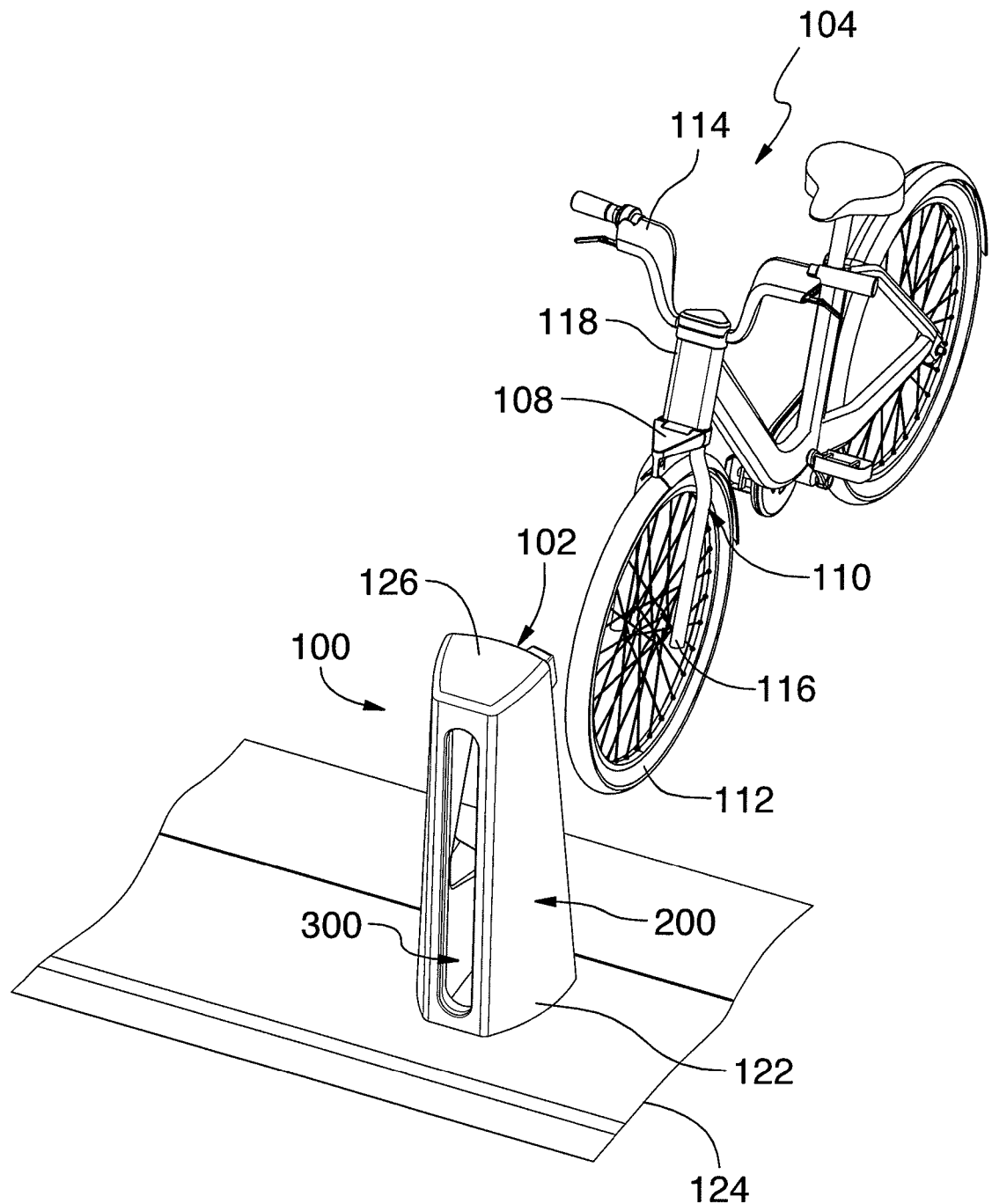
FIG. 3 is a front perspective view of the bicycle rack shown in FIG. 1.

Now referring to FIGS. 1 to 3, there is shown a bicycle rack 100 having an electronic lock 102 mounted thereon in accordance with one embodiment. There is further shown a bicycle 104 removed from the bicycle rack 100.

The electronic lock 102 comprises first and second complementary cooperating connecting members, each being fixedly mounted to a respective one of the bicycle 104 and the bicycle rack 100. In the illustrated embodiment, the first connecting member comprises a female connector 106 mounted to the bicycle rack 100 and the second connecting member comprises a corresponding complementary male connector 108 mounted to the bicycle 104, as better shown in FIG. 2.

As it will be more clearly detailed thereinafter, the male connector 108 and the female connector 106 are engageable together in a lockable position.

In the embodiment shown in FIGS. 1 to 3, the bicycle 104 comprises a front fork 110, a front wheel 112 and a handlebar 114. More specifically, the front fork 110 comprises a first lower end 116 having the front wheel 112 rotatably mounted thereto and a second opposed upper end 118 whereto the handlebar 114 is fixedly mounted. The skilled addressee will appreciate that, in such an embodiment, the handlebar 114 may be used to rotate the front wheel 112.

Still in the embodiment shown in FIGS. 1 to 3, the male connector 108 is fixedly mounted to the front fork 110 of the bicycle 104. This configuration is of great advantage since it facilitates the engagement of the bicycle 104 in the bicycle rack 100.

Still referring to FIGS. 1 to 3, in one embodiment, the bicycle rack 100 comprises a substantially vertical hollow elongated frame 120 having a first lower end 122 fixedly attached to a base 124 and an opposed upper end 126 comprising a female connector fixing recess 128. The female connector 106 is fixedly mounted in the female connector fixing recess 128 using fixing means (not shown) such as bolts and screws. The skilled addressee will appreciate that any other fixing means adapted to fixedly secure the female connector 106 in the recess 128 may be considered.

In one embodiment, the base 124 comprises a structure adapted for mounting at least one bicycle rack thereon.

In an alternative embodiment, the base 124 comprises a substantially horizontal ground surface such as a parking lot, a sidewalk, a portion of a street or the like.

The skilled addressee will appreciate that, in one embodiment the female connector 106 is vertically positioned at a level substantially corresponding to the level of the male connector 108 when the front wheel 112 of the bicycle 104 is lying on the base 124. This configuration helps the user of the bicycle 104 to guide the male connector 108 towards the female connector 106 without having to lift the bicycle 104, which is of great advantage.

As previously mentioned, in one embodiment, the bicycle rack 100 is part of a bicycle rental station, the bicycle rental station being part of a bicycle rental system. It will be appreciated that such a bicycle rental station is generally installed in a public area. Therefore, to prevent the female connector 106 from being tampered with, stolen or otherwise vandalized, the female connector fixing means (not shown) is advantageously robust and reliable.

In one embodiment, the female connector fixing means comprise fasteners provided with a corresponding special unfastening tool, the special unfastening tool being in the possession of an operator of the bicycle renting system. This configuration advantageously enables the operator to selectively remove the female connector from the bicycle rack for maintenance purposes or other purposes while preventing undesired removal of the female connector 106 from the bicycle rack 100 by an unauthorized person.

In another embodiment, the female connector fixing means comprise welding the female connector 106 inside the female connector fixing recess 128. It will however be appreciated that any other means adapted for preventing an unauthorized removal of the female connector 106 from the bicycle rack 100 may be considered.

For example, in yet another embodiment, the female connector 106 and the hollow elongated frame 120 may form an integral structure.

As better shown in FIG. 3, the illustrated bicycle rack 100 further comprises a vertical wheel receiving slot 300 defined on the hollow elongated frame 120, this wheel receiving slot 300 being adapted to receive therein the front wheel 112 of the bicycle 104.

In one embodiment, the hollow elongated frame 120 may further comprise a pair of wheel guiding members 130, 132 extending vertically between the lower end 122 and the opposed upper end 126 of the bicycle rack 100, the wheel guiding members 132, 134 being positioned on both sides of the wheel receiving slot 300, as best shown in FIG. 2.

The wheel guiding members 130, 132 enable the guiding of the bicycle wheel 112 forwardly when the bicycle 104 is engaging the wheel receiving slot 300. It will be appreciated that the wheel guiding members 130, 132 and the wheel receiving slot 300 may contribute to the alignment of the male connector 108 with the female connector 106, as it will become apparent below.

The skilled addressee will appreciate that the shape of the bicycle rack 100 is dependent on where the male connector 108 is mounted to the bicycle 104. For example, in an alternative embodiment, the bicycle rack 100 may comprise a vertical pole having a first lower end attached to a base and a second, opposed upper end, the female connector 106 being mounted at the upper end of the pole.

In yet another embodiment, the bicycle rack 100 may comprise a horizontal docking bar having a plurality of spaced apart female connectors fixedly mounted thereon, the plurality of female connectors being adapted for receiving a plurality of male connectors therein.

The skilled addressee will appreciate that various other configurations may be considered for the bicycle rack 100.

Now referring to FIGS. 4 and 4A, there is shown a bicycle 104 secured to a bicycle rack 100 using the electronic lock 102.

It will be appreciated that in the embodiment shown in FIGS. 4 and 4A, the male connector 108 and the corresponding female connector 106 are engaged together in the lockable position, while In the embodiment shown in FIGS. 1 to 3, the male connector 108 is disengaged from the corresponding female connector 106.

It will be further appreciated that in the embodiment shown in FIGS. 4 and 4A, the front wheel 112 of the bicycle 104 is engaged in the wheel receiving slot 300, while in the embodiment shown in FIGS. 1 to 3, the front wheel 112 of the bicycle 104 is disengaged from the wheel receiving slot 300.

The operation of engaging the male connector 108 and the female connector 106 together in the lockable position will now be described in accordance with one embodiment, with reference to FIGS. 1 to 4A.

The bicycle 104 is first positioned near the bicycle rack 100, the male connector 108 generally facing towards the female connector 106, as shown in FIGS. 1 to 3. A user uses the handlebar 114 to rotate the front wheel 112 of the bicycle 104 until the front wheel 112 is aligned with the wheel receiving slot 300.

The bicycle 104 may now be moved forwardly in a direction F using the handlebar 114 such that the front wheel 112 of the bicycle 104 engages the wheel receiving slot 300, as shown in FIGS. 4 and 4A. It will be appreciated that the wheel guiding members 130, 132 further contributes to guide the bicycle wheel 112 forwardly into the wheel receiving slot 300.

It will be further appreciated that in this embodiment, guiding the front bicycle wheel 112 forwardly causes the male connector 108, advantageously mounted to the fork 110 of the bicycle, to be guided towards the female connector 106.

The bicycle is further moved forwardly in the direction F until the male connector 108 and the female connector 106 engage together in the lockable position. Once they are engaged in the lockable position, the electronic lock 102 can be used to secure the connectors 106, 108 together, thereby securing the bicycle 104 to the bicycle rack 100, as it will become apparent below.

It will be appreciated that such a positioning of the male connector 106 at the front of the bicycle 104 advantageously enables a user to move the bicycle 104 forward by using the handlebar 114 while standing of either the left or right side of the bicycle 104. Thus, the securing of the bicycle 104 in the rack 100 is facilitated, which is of great advantage.

Figure 5A:
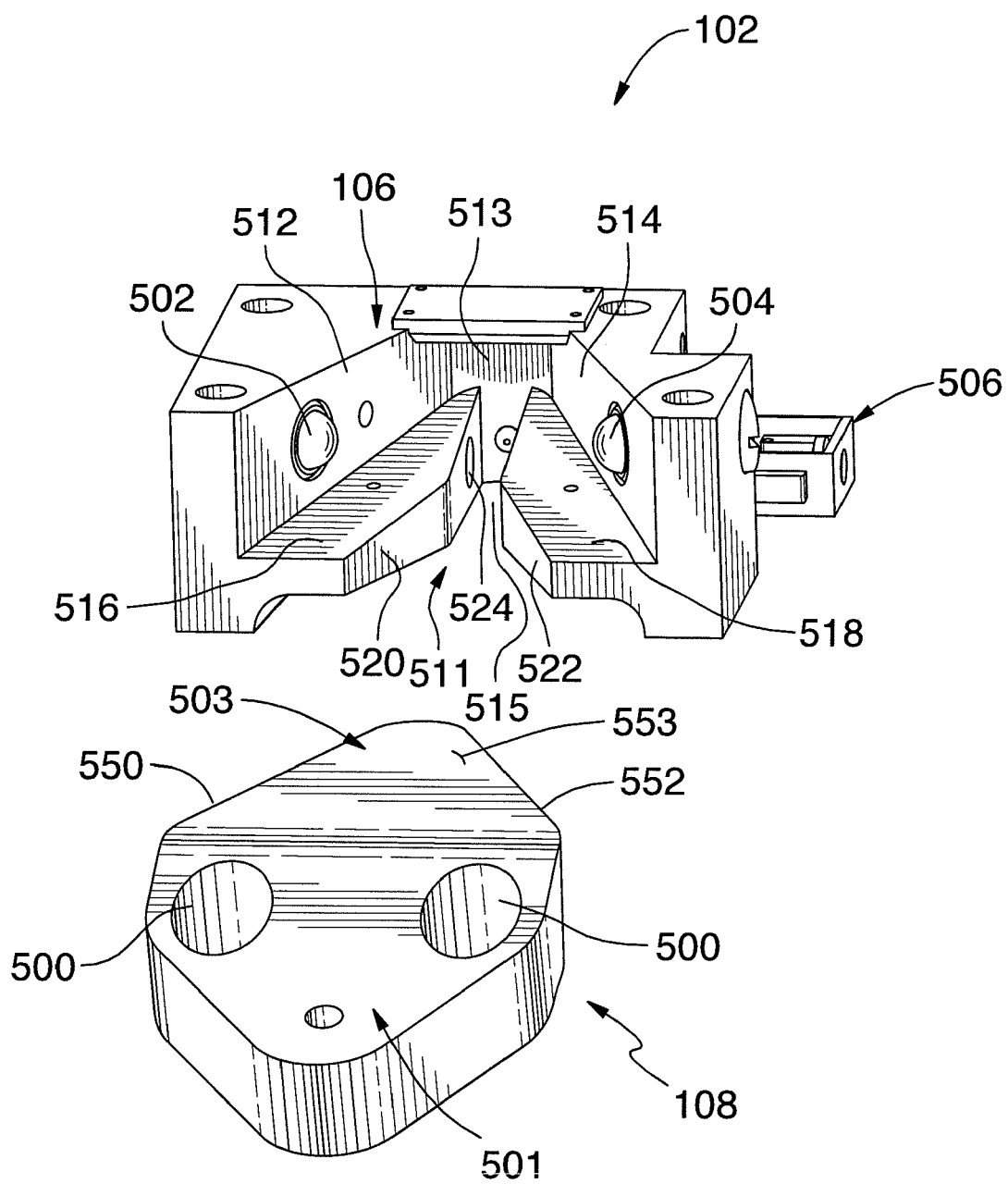
FIG. 5A is a front perspective view of an electronic lock for removably securing a movable item to a structure, in accordance with one embodiment.
Figure 5B:
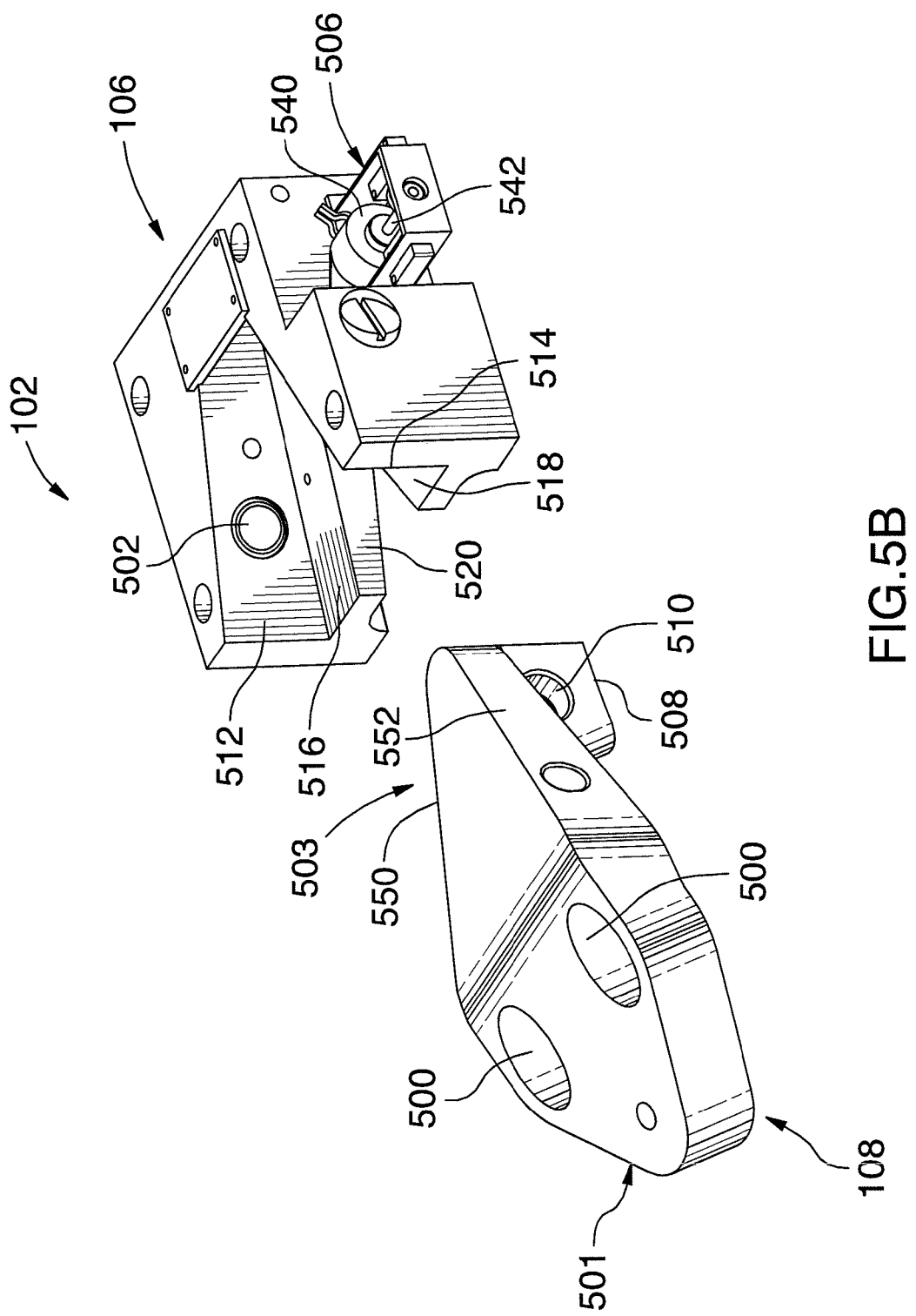
FIG. 5B is a right perspective view of the electronic lock shown in FIG. 5A.

Now referring to FIGS. 5A and 5B, there is shown an electronic lock 102 for removably securing a bicycle 104 (not shown) to a bicycle rack 100 (not shown).

In the illustrated embodiment, the male connector 108 comprises a back portion 501 and a front tapered portion 503 forwardly extending therefrom. The front tapered portion 503 comprises two opposed side surfaces 550, 552 converging towards each other, a bottom surface 551 and a top surface 553, as better shown in FIGS. 12A and 12B.

More specifically, in the illustrated embodiment, each of the two opposed side surfaces 550, 552 comprise a substantially vertical planar surface, these two opposed side surfaces 550, 552 converging towards each other to thereby define a V-shape.

In one embodiment, the male connector 108 comprises attaching means for fixedly attaching the male connector 108 to the front fork 110 of the bicycle 104 (not shown). In the embodiment shown in FIGS. 5A and 5B, the attaching means are provided on the back portion 501 and comprise two cylindrical holes 500 vertically oriented and adapted to fixedly receive therein the fork 110 of the bicycle 104. The skilled addressee will appreciate that various other arrangements may be considered.

In the embodiment shown in FIGS. 5A and 5B, the back portion 501 and the front tapered portion 503 of the male connector 108 form an integral structure.

Figure 5C:
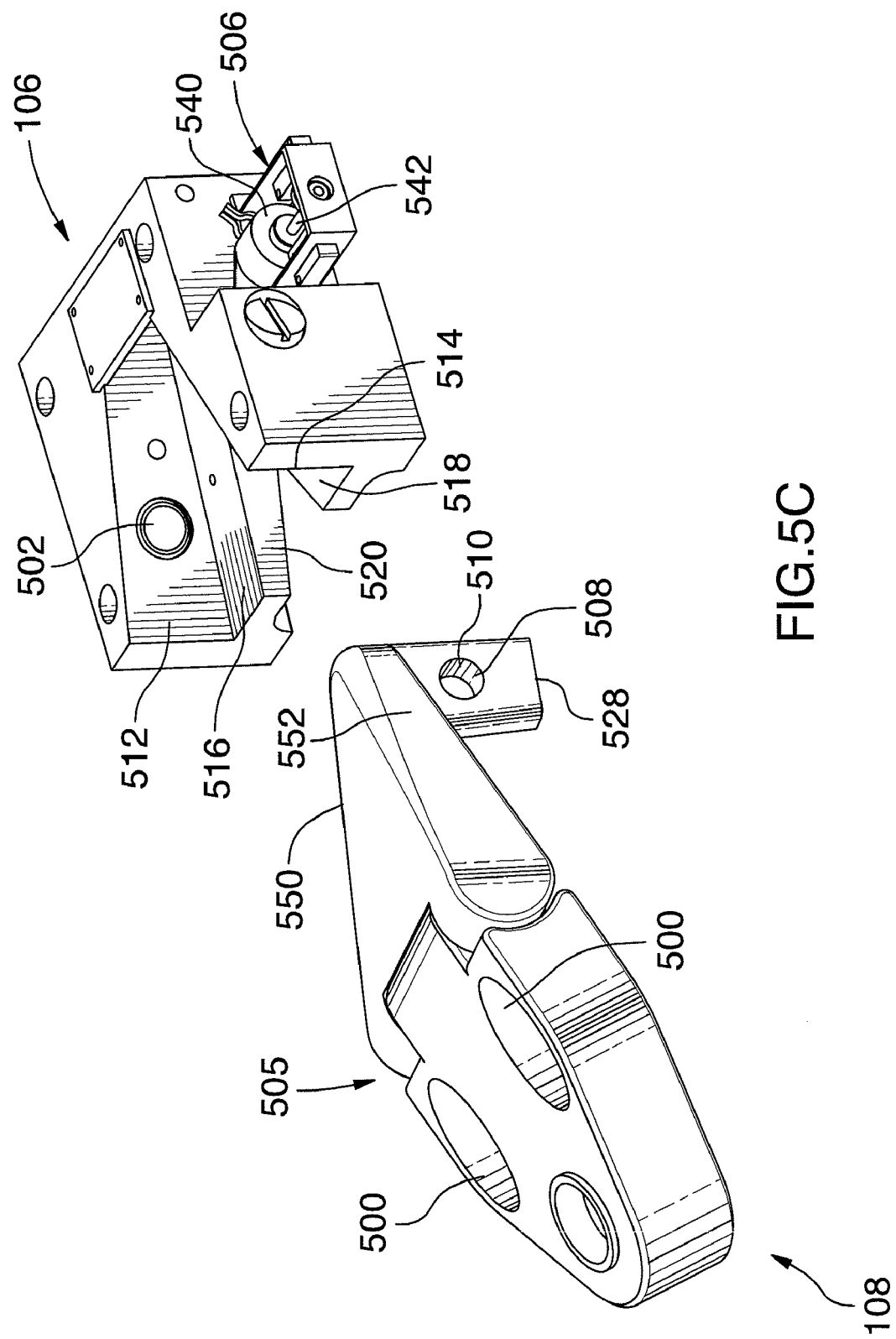
FIG. 5C is a right perspective view of another electronic lock for removably securing a movable item to a structure.

Now referring to FIG. 5C, there is shown an alternative embodiment of a male connector 108. In the illustrated embodiment, the male connector 108 further comprises a hinge 505 extending between the front tapered portion 503 and the back portion 501 for enabling a jointed coupling therebetween.

More specifically, in one embodiment, the hinge 505 comprises a pair of opposed pivoting hinge members, each being respectively attached to a corresponding one of the back portion 501 and the front portion 503 so as to enable an upward pivoting movement of the back portion 501 with respect to the front tapered portion 503.

One skilled in the art will appreciate that such a configuration prevents a malicious individual from damaging the male connector 108 by applying an upward force at a back end of the bicycle 104, thereby using the bicycle 104 as a lever. This configuration may be of great advantage in the case where the electronic lock 102 is located in a public area and may be subject to acts of vandalism.

In one embodiment, the hinge 505 further comprises a torsion spring (not shown) resiliently connecting the front tapered portion 503 to the back portion 501. It will be appreciated that other arrangements may be considered to provide an articulated connection between the back portion 501 and the front tapered portion 503.

Figure 12A:
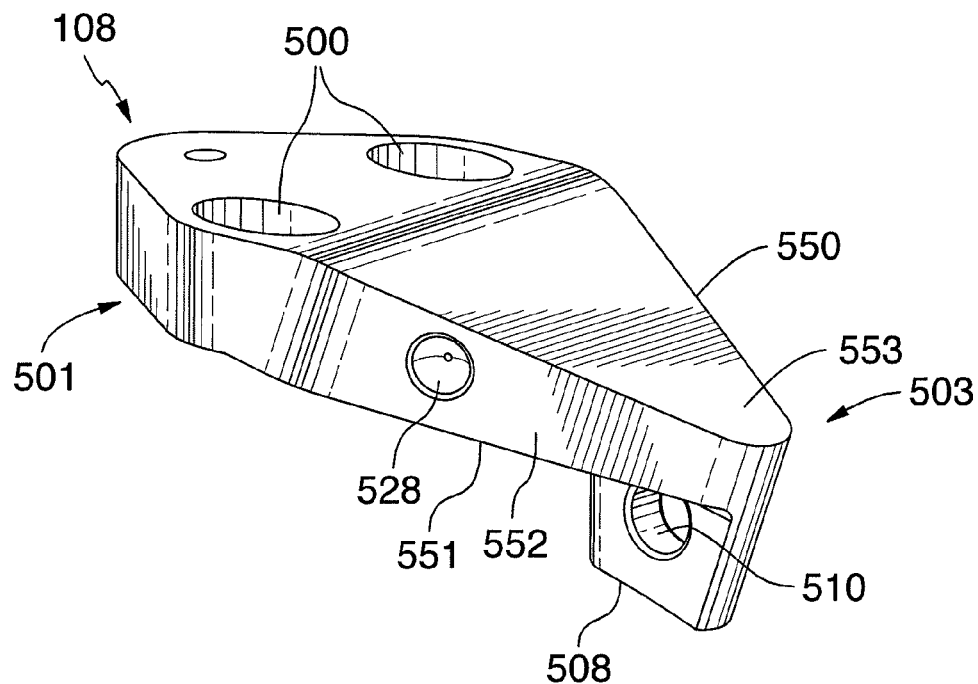
FIG. 12A is a left perspective view of the male connector of an electronic lock for removably securing a movable item to a structure.
Figure 12B:
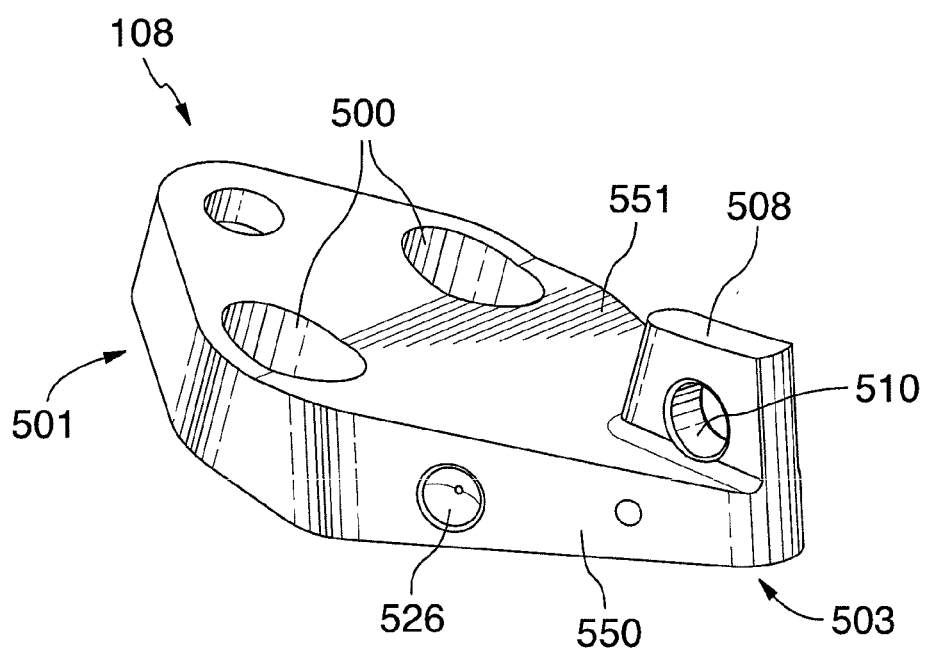
FIG. 12B is a bottom perspective view of the male connector shown in FIG. 12A.

Now referring to FIGS. 5B, 12A and 12B, in one embodiment, the male connector 108 further comprises a locking finger 508 extending downwardly from the front tapered portion 503. The locking finger 508 is substantially vertical and is provided with a locking aperture 510 thereon. In this embodiment, the locking aperture 510 has an axis extending substantially horizontally through the locking finger 508, perpendicularly to the direction F.

In one embodiment, the locking finger 508 and the front tapered portion 503 form an integral structure. Such a configuration provides the male connector 108 with an improved resistance to vandalism, which is of great advantage in the case where the electronic lock 102 is used in a public bicycle rental system.

In another embodiment, the locking finger 508 is welded to the bottom surface 551 of the front tapered portion 503 using welding techniques known to the skilled addressee such as arc welding, stick welding, plasma welding, TIG welding or the like.

In yet another embodiment, the locking finger 508 may be glued to the bottom surface 551 of the front tapered portion 503 using an adhesive known to the skilled addressee, such as epoxy or the like.

In yet another embodiment, the male connector 108 may not comprise a locking finger 508. In such an embodiment, the locking aperture 510 is instead provided on the front tapered portion 503 of the male connector 108.

Now referring back to FIGS. 5A and 5B, in one embodiment, the female connector 106 comprises a recess 511 adapted for receiving the front tapered portion 503 of the male connector therein. More specifically, the recess 511 comprises a tapered portion having two opposed inner side walls 512, 514. In one embodiment, each of the two opposed side walls 512, 514 comprises a substantially vertical planar surface, the two opposed side walls 512, 514 converging towards each other to thereby define a V-shape therebetween.

In another embodiment, each of the two opposed side walls 512, 514 may comprise a concave or convex surface adapted to receive a corresponding convex or concave surface of the front tapered portion 503.

The skilled addressee will appreciate that various other configurations may be considered for the two opposed side walls 512, 514, as long as the shape of the recess 511 is complementary to the shape of the front tapered portion 503 of the male connector 108. For example, corresponding complementary vertically slanted surfaces may be envisaged.

Still referring to FIGS. 5A and 5B, in one embodiment, the recess 511 further comprises a back wall 513 wherefrom extend outwardly and backwardly the two opposed inner side walls 512, 514. In an alternative embodiment, the recess 511 may not comprise a back wall. Instead, the two opposed inner side walls 512, 514 may converge forwardly towards an opening defined therebetween.

In one embodiment, the recess 511 further comprises two opposed sitting members 516, 518 projecting inwardly into the recess 511. The two opposed sitting members 516, 518 are adapted for slidably receiving thereon the bottom surface 551 of the tapered portion 503 of the male connector 108, as it will become apparent below.

Figure 7:
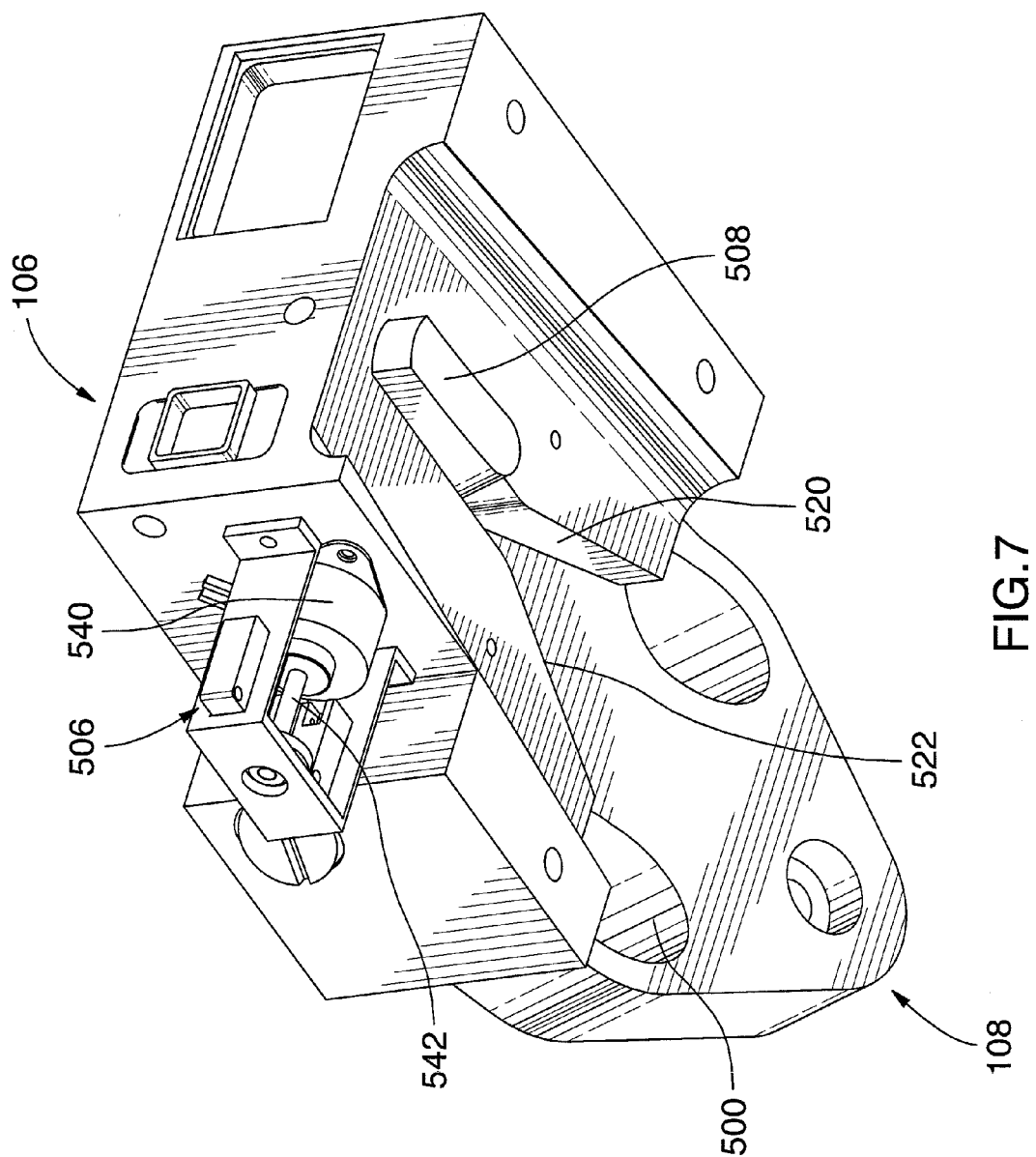
FIG. 7 is a bottom perspective view of the electronic lock shown in FIG. 6.
Figure 8A:
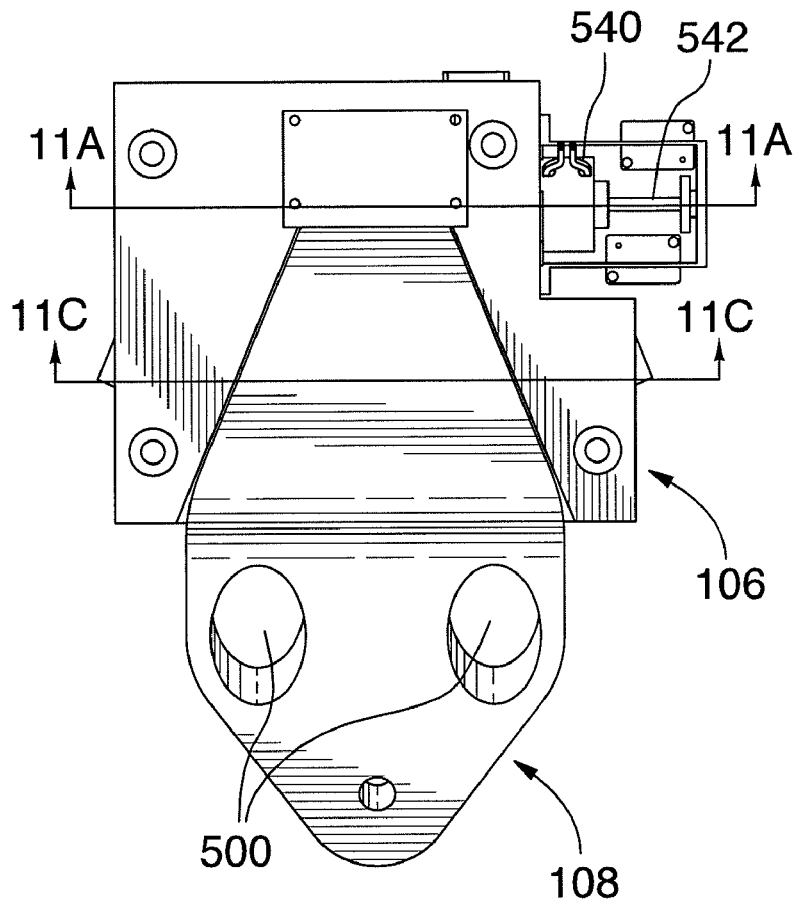
FIG. 8A is a left side elevation view of the electronic lock shown in FIG. 6.
Figure 8B:
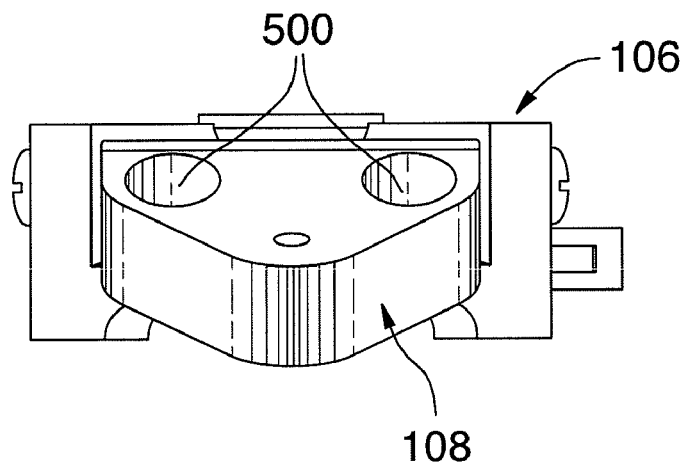
FIG. 8B is a top plan view of the electronic lock shown in FIG. 6.
Figure 8C:
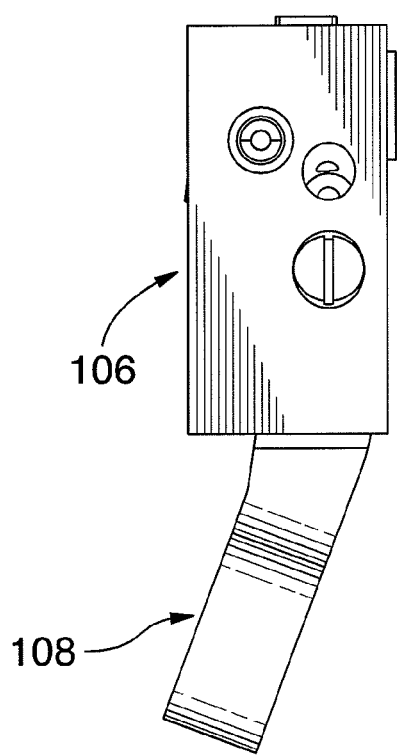
FIG. 8C is a right side elevation view of the electronic lock shown in FIG. 6.
Figure 8D:
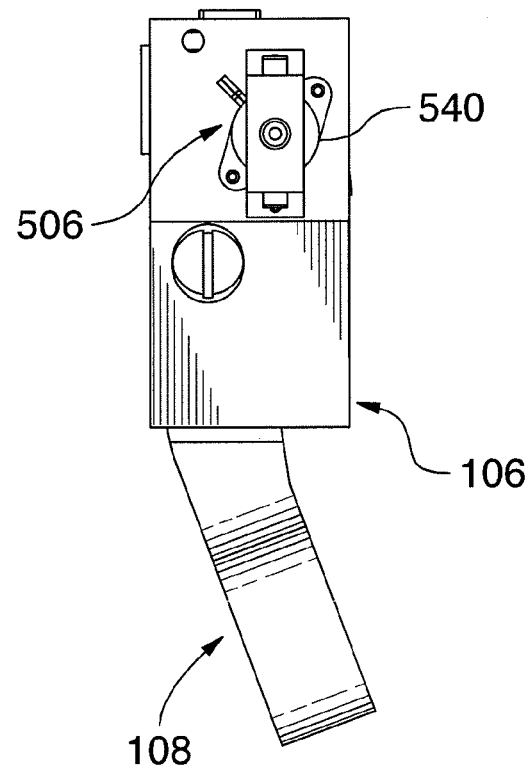
FIG. 8D is a front elevation view of the electronic lock shown in FIG. 6.

Still referring to FIGS. 5A and 5B, in one embodiment, the recess 511 further comprises two opposed lower inner side walls 520, 522 converging towards each other and defining a finger channel 515 adapted for receiving the locking finger 508 therein, as better shown in FIG. 7.

More specifically, according to one embodiment, each of the two opposed sitting members 516, 518 comprise a fin or a protruding member extending sidewardly from the two opposed inner side walls 512, 514 in a flange-like configuration. Each of the two fins comprises a top sitting surface adapted to receive thereon the bottom surface 551 of the tapered portion 503 of the male connector 108.

In one embodiment, the two opposed lower inner side walls 520, 522 comprise two planar surfaces extending substantially downwardly from the two top sitting surfaces.

In the embodiment shown in FIGS. 5A and 5B, each of the two opposed lower inner side walls 520, 522 comprise a front portion and a back portion. The two back portions face each other and define the finger channel 515 therebetween which is adapted to receive the locking finger 508 therein. The two front portions face each other and define a V-shaped guiding channel in front of the finger channel 515 for guiding the locking finger 508 therein.

The skilled addressee will appreciate that the above described arrangement may help guiding the male connector 108 into the female connector 106 using the two opposed lower inner side walls 520, 522, which is of great advantage.

In the illustrated embodiment, each of the two opposed sitting members 516, 518 comprise a continuous surface. The skilled addressee will however appreciate that a plurality of spaced apart top surfaces may be considered. For instance, the two opposed sitting members 516, 518 may comprise a plurality of spaced apart cantilevers extending inwardly into the recess 511 from the two opposed inner side walls 512, 514, the spaced apart cantilevers being aligned so as to form a path on which the front tapered portion 503 of the male connector 108 may travel towards the lockable position.

In the embodiment illustrated in FIG. 5A, the sitting members 516, 518 provide a substantially planar sliding surface. The skilled addressee will however appreciate that a surface slightly curved upwardly may be considered and may further facilitate the insertion of the male connector 108 in the female connector 106.

The skilled addressee will appreciate that various configurations of the recess 511 of the female connector 106 and of the front tapered portion 503 of the male connector 108 may be provided, as long as the front tapered portion 503 of the male connector 108 and the recess 511 of the female connector 106 are complementary such that the front tapered portion 503 of the male connector 108 may snuggly engage the recess 511, as it will become apparent below.

Now referring to FIGS. 6 to 8D, there is shown an electronic lock 102 that may be used for removably securing a bicycle to a bicycle rack, the male connector 108 and the female connector 106 being engaged together in the lockable position. It will be appreciated that in the illustrated embodiment, the male connector 108 has not yet been secured to the female connector 106.

Figure 6:
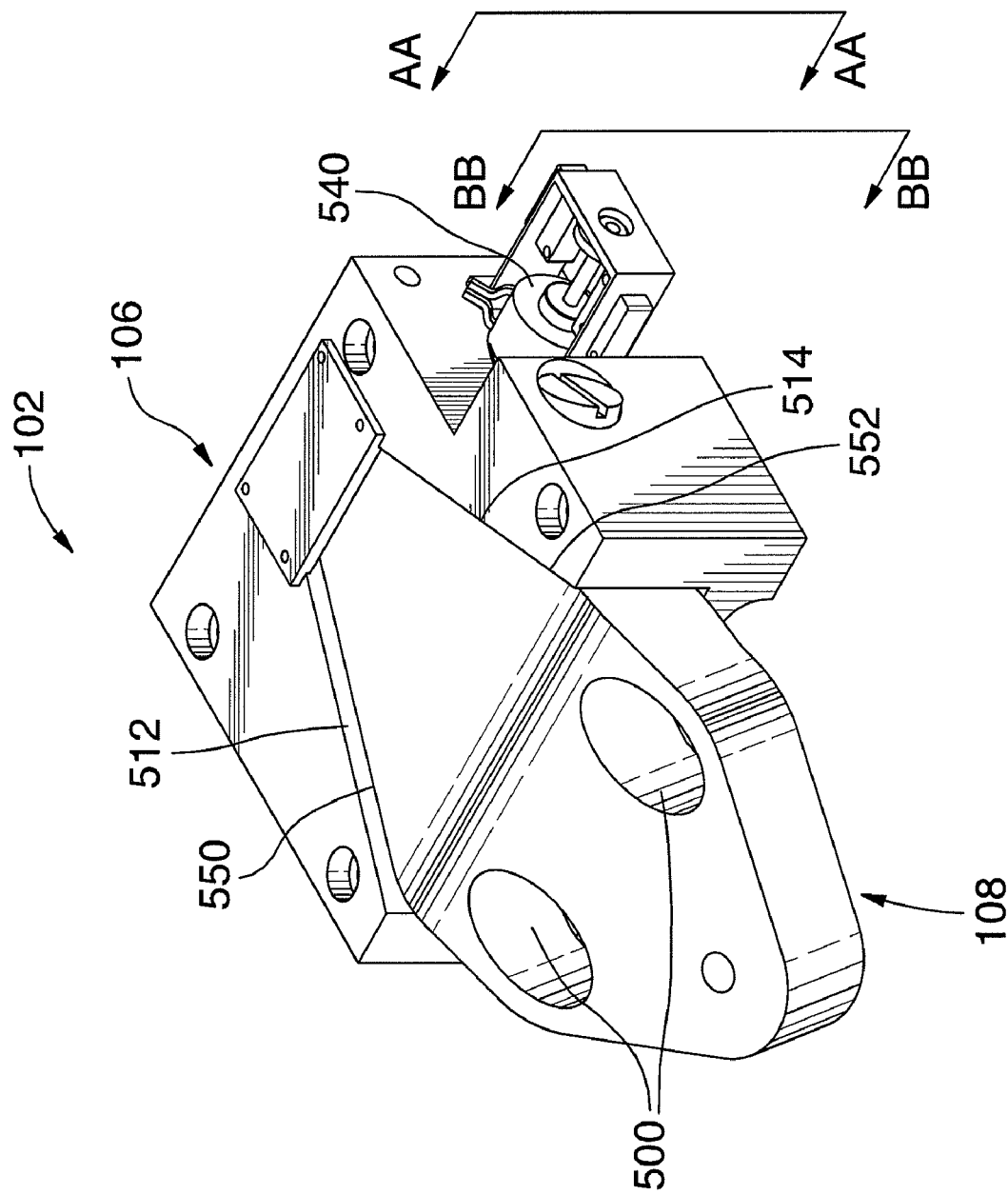
FIG. 6 is a right perspective view of the electronic lock shown in FIG. 5B wherein the male connector is engaged with the female connector.

As better shown in FIG. 6, the front tapered portion 503 of the male connector 108 snuggly engages the tapered portion of the recess 511 of the female connector 106. In other words, the two opposed side surfaces 550, 552 of the front tapered portion 503 of the male connector 108 respectively abut the two corresponding opposed inner side walls 512, 514 of the recess 511 of the female connector 106. In the meantime, the bottom surface 551 of the front tapered portion 503 is lying on the two opposed sitting members 516, 518.

Such a position of the male connector 108 with respect to the female connector 106 enables a selective locking of the electronic lock using a securing assembly, as it will be more clearly detailed below.

As previously mentioned, it will be appreciated that various other arrangements may be considered for the male connector 108 and the female connector 106, as long as they are complementary to each other and engageable in a lockable position.

Figure 9:
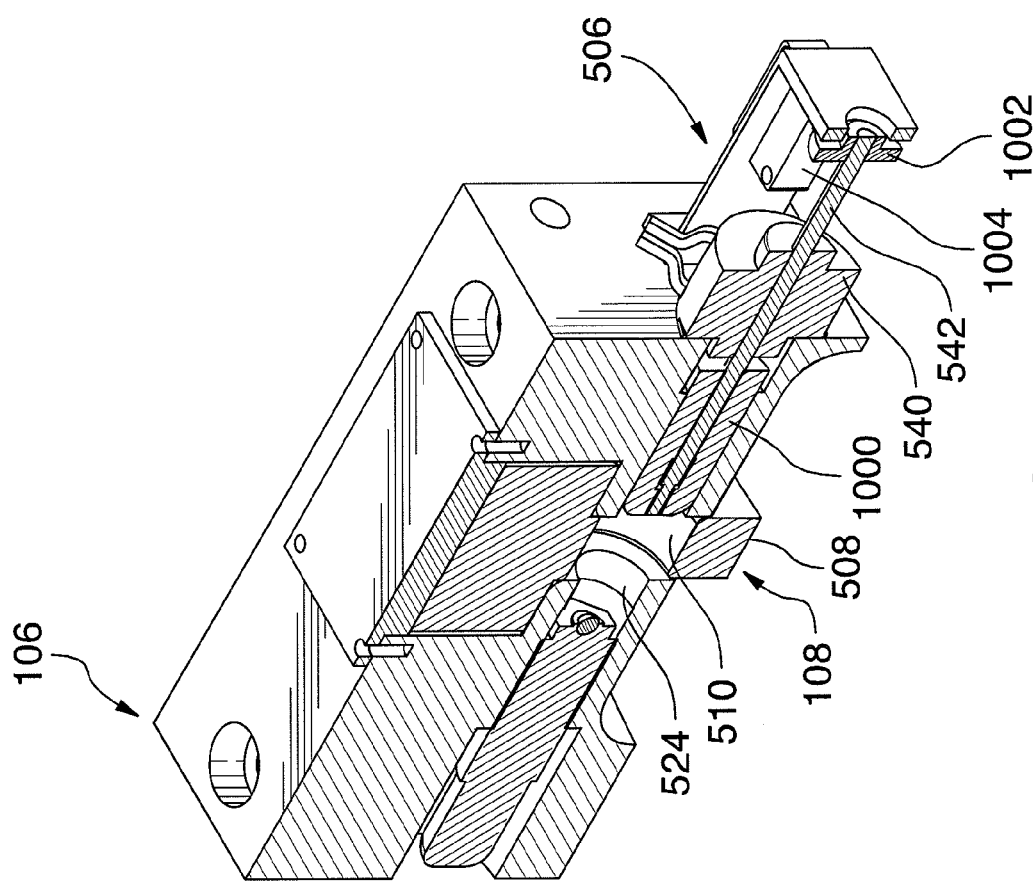
FIG. 9 is a 3D perspective view, cross-sectioned along lines AA-AA of FIG. 6, of the electronic lock shown in FIG. 6.
Figure 11A:
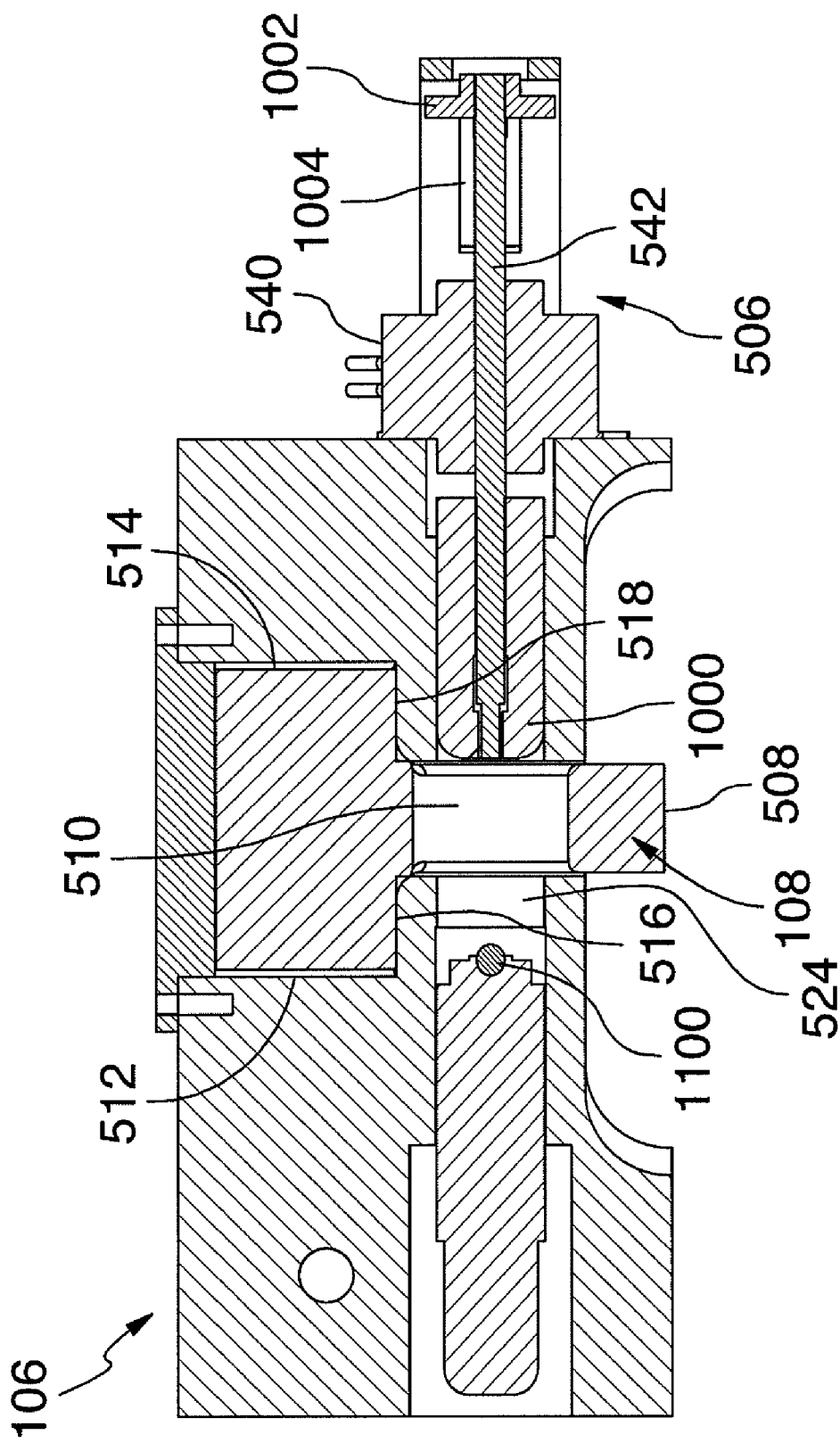
FIG. 11A is a front elevation view, cross-sectioned along lines AA-AA of FIG. 6, of the electronic lock shown in FIG. 6, wherein the male connector is unsecured from the female connector.

Now referring to FIGS. 9 and 11A, the electronic lock further comprises a securing assembly 506 for securing the male connector 108 and the female connector 106 together when engaged in the lockable position shown in FIG. 6 to 8D.

It will be appreciated that, in the embodiment shown in FIGS. 9 and 11A, the male connector 108 and the female connector 106 are engaged in the lockable position, but the male connector 108 is not yet secured to the female connector 106.

In one embodiment, the securing assembly 506 comprises a movable locking member 1000 operatively associated to the female connector 106. The locking aperture 510 provided on the locking finger 508 is adapted to receive the movable locking member 1000 when the male connector 108 and the female connector 106 are engaged together in the lockable position. Throughout the following description, the securing assembly 506 will be described as being associated to the female connector 106 but the skilled addressee will appreciate that the securing assembly may be alternatively associated to the male connector 108.

In the illustrated embodiment, the movable locking member 1000 comprises an elongated member axially translatable between an unlocked position enabling disengagement of the male connector 108 and the female connector 106 and a locked position wherein the movable locking member 1000 engages the locking aperture 510 to prevent disengagement of the two connectors 106, 108.

The movable locking member 1000 is translatable in a bore defined in the female connector 106, the bore being coaxial to the locking aperture 510. In other words, the bore is positioned such that it is axially aligned with the locking aperture 510 when the male connector 108 and the female connector 106 are engaged together in the lockable position so as to enable a translation of the locking member 1000 in and out of the locking aperture 510.

Still referring to FIGS. 9 and 11A, the securing assembly 506 further comprises an actuator operatively coupled to the movable locking member 1000 for actuating the movable locking member 1000 between the unlocked position and the locked position.

In the illustrated embodiment, the actuator comprises a motor 540 and a shaft 542 driven by the motor 540, the shaft 542 being attached to the movable locking member 1000 for driving the movable locking member 1000 between the unlocked position and the locked position.

In one embodiment, the motor 540 comprises a stepping motor and the shaft 542 comprises an externally threaded shaft rotatably coupled to the motor 540. The skilled addressee will appreciate that various other arrangements may be considered. For example, other actuators known in the art, such as a pneumatic actuator, a hydraulic actuator, a magnetic actuator or the like, may be used to drive the shaft.

In one embodiment, the actuator is automatic. It will be appreciated that in this embodiment, no physical effort from a user is required, which is of great advantage as it will become apparent below.

Figure 11B:
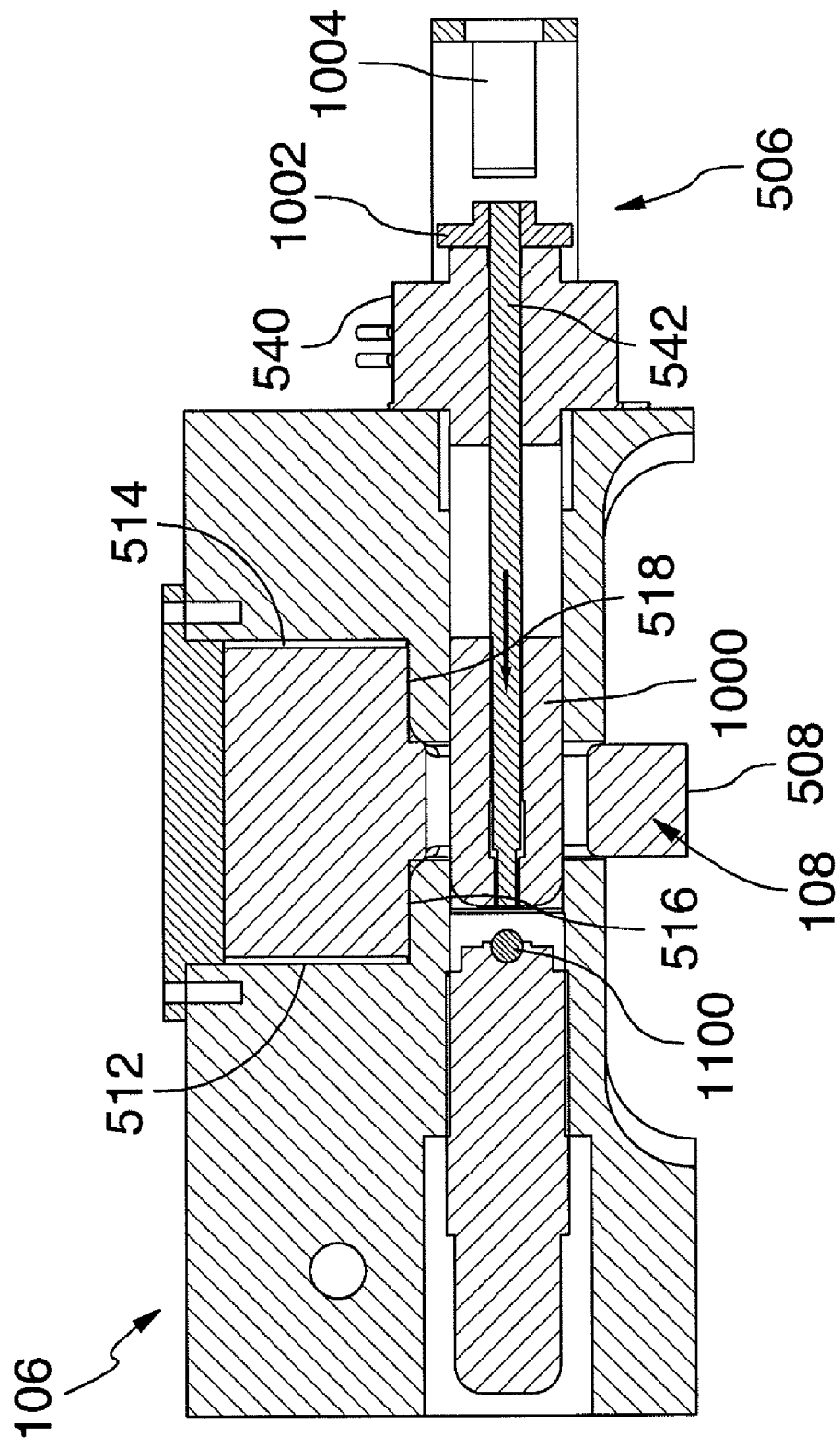
FIG. 11B is another front elevation view, cross-sectioned along lines AA-AA of FIG. 6, of the electronic lock shown in FIG. 6 wherein the male connector has been secured in the female connector.

In the illustrated embodiment, an additional bore 524 coaxial to the first one is provided in the female connector 106, as better shown in FIG. 5A. Thus, when actuated in the locked position, the locking member 1000 simultaneously engages the first bore, the locking aperture 510 and the additional bore 524, as illustrated in FIG. 11B. In other words, the locking member 1000 is engaged at both ends in the female connector 106 through the locking aperture 510 when the locking member 1000 is in the locked position.

One skilled in the art will appreciate that this configuration provides a great advantage to the electronic lock. Indeed, if the male connector is forcibly pulled from the female connector in a direction opposed to the direction F in an effort to remove the bicycle from the bicycle rack when the locking member is in the locked position, a force exerted by the locking finger on the locking member will be distributed between both ends of the locking member engaged in the female connector 106. This configuration is of great advantage for providing a robust securing of the bicycle to the bicycle rack.

The skilled addressee will appreciate that other arrangements may be considered. For example, the locking aperture 510 may comprise a blind hole adapted to receive a corresponding end of the locking member 1000.

Figure 10:
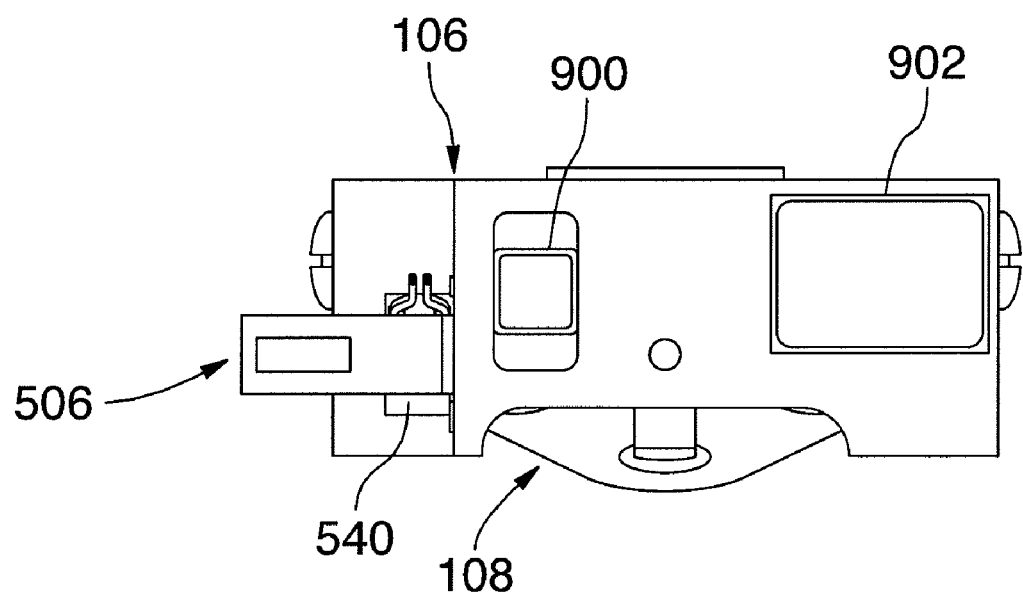
FIG. 10 is a rear elevation view of the electronic lock shown in FIG. 6.

Now referring to FIG. 10, the securing assembly 506 further comprises electronic control means operatively coupled to the actuator for controlling selective actuation of the movable locking member 1000 from the unlocked position to the locked position when the male connector 108 and the female connector 106 are engaged together in the lockable position. Moreover, the electronic control means also controls selective actuation of the movable locking member 1000 from the locked position to the unlocked position, as it will become apparent below.

In one embodiment, actuation of the movable locking member is automatic. More specifically, in this embodiment, the electronic control means are operatively coupled to the actuator such that they selectively urge activation of the actuator. This causes the movable locking member 1000 to be actuated from the unlocked position to the locked position or from the locked position to the unlocked position to the locked position, as mentioned hereabove.

One will appreciate that this configuration is of great advantage since it requires no physical effort from the user to displace the movable locking member 1000, thereby reducing the risk of injury and the inconvenience related to such an activity.

Moreover, the actuation of the movable locking member 1000 being automatic and requiring no physical effort from a user, the need to provide manual means to activate the actuator, such as a lever, a button or the like, is eliminated. In this configuration, the electronic control means and the actuator may be enclosed in a protective shell, as is the case in one embodiment. This configuration is also of great advantage, since it protects sensitive parts of the electronic control means and the actuator from damage, for instance caused by rain, wind, dust, vandalism or the like.

In one embodiment, the electronic control means comprise integrated electronic control components 902 fixedly mounted into the female connector 106.

In a further embodiment, the electronic control means further comprise a modular electronic connector 900 operatively connected to the integrated electronic control components 902. The modular electronic connector 900 is provided for connecting the integrated electronic control components 902 to a processing terminal (not shown), for instance a bicycle rental terminal of an automated bicycle rental station.

In another embodiment, the electronic control means comprise unsecuring means for enabling an actuating of the movable locking member 1000 from the locked position to the unlocked position. The unsecuring means may be selected from a group consisting of a card reader adapted for receiving a corresponding user card, a keypad adapted for receiving a user code and a bar code reader adapted for reading a corresponding bar code.

In the embodiment illustrated in FIGS. 4 and 4A, the unsecuring means comprise a card reader, more specifically a magnetic card reader 400, adapted for receiving a corresponding user card 402. The skilled addressee will appreciate that other arrangements enabling an identification of the user prior to the unsecuring of the bicycle may be used.

Referring now to FIG. 9, the securing assembly 506 may further comprises shaft position detecting means for monitoring a position of the shaft to thereby monitor a position of the movable locking member 1000. In one embodiment, the shaft position detecting means is connected to the control means.

According to one embodiment, the shaft position detecting means comprise a mechanical detector. In this embodiment, the shaft position detecting means comprise a sensor 1002 fixedly mounted to the second end of the shaft 542. More specifically, in this embodiment, the motor comprises a central bore wherein the shaft is axially engaged therethrough, the first end of the shaft 542 extending coaxially towards the recess 511 and the second end of the shaft 542 extending from a second, opposed end of the motor.

In one embodiment, the shaft position detecting means further comprise a mechanical switch 1004 positioned near the second end of the shaft 542, the mechanical switch being located such that it may be activated by the sensor 1002 when the locking member is in the unlocked position.

In a further embodiment, the shaft position detecting means may comprise a second detector 1100 positioned near the first end of the shaft 542. This second detector 1100 may be used to validate that the male connector 108 is really secured to the female connector 106, which is of great advantage.

In another embodiment, the shaft position detecting means may comprise an optical detector conveniently mounted proximate either the second end of the shaft or the first end of the shaft 542.

The skilled addressee will appreciate that, in one embodiment, each of the detectors may be adapted to detect a position of the shaft 542 and an associated position of the movable locking member 1000 in the locked position.

In one embodiment, the shaft position detecting means may comprise both a mechanical detector and an optical detector. The skilled addressee will appreciate that such an embodiment is of great advantage since it provides an enhanced reliability to the system. Indeed, this arrangement may improve the reliance of the operator with respect to the system.

Referring back to FIGS. 5A and 5B, in one embodiment, the electronic lock 102 further comprises holding means adapted for cooperating with each of the connecting members 106, 108 for temporarily holding the connecting members 106, 108 together in the lockable position.

In the illustrated embodiment, the holding means comprise a pair of opposed biased elements 502, 504 mounted to the female connector 106. Each of the biased element 502, 504 has a resting position wherein the element is urged outwardly and protrudes from the corresponding connecting member.

In this embodiment, the holding means further comprise a pair of receiving recesses 526, 528 mounted to the male connector 108, as better shown in FIGS. 12A and 12B. The pair of receiving recesses 526, 528 corresponds to the pair of opposed biased elements 502, 504 and is adapted to receive therein a corresponding biased element 502, 504 when the male connector 108 and the female connector 106 are engaged in the lockable position.

In the illustrated embodiment, each of the opposed biased elements 502, 504 is mounted to one of the opposed inner side walls 512, 514 of the tapered portion 503 of the female connector 106. Moreover, each of the receiving recesses 526, 528 is mounted to one of the opposed side surfaces 550, 552 of the tapered portion 503 of the male connector 108.

In another embodiment, each of the opposed biased elements 502, 504 may be mounted to one of the opposed side surfaces 550, 552 of the tapered portion 503 of the male connector 108. In this case, each of the receiving recesses 526, 528 is mounted to one of the opposed inner side walls 512, 514 of the tapered portion 503 of the female connector 106.

It will be appreciated that the opposed biased elements and corresponding recesses may be positioned according to various configurations, as long as the opposed biased elements are mounted to one of the male connector and the female connector and the corresponding cooperating receiving recesses are mounted to the remaining connector. The skilled addressee will however appreciate that various other configuration may be considered.

The holding means are of great advantage since they allow the user of a bicycle to be informed that the bicycle has been conveniently positioned in the corresponding rack before securing it to the rack.

Figure 11C:
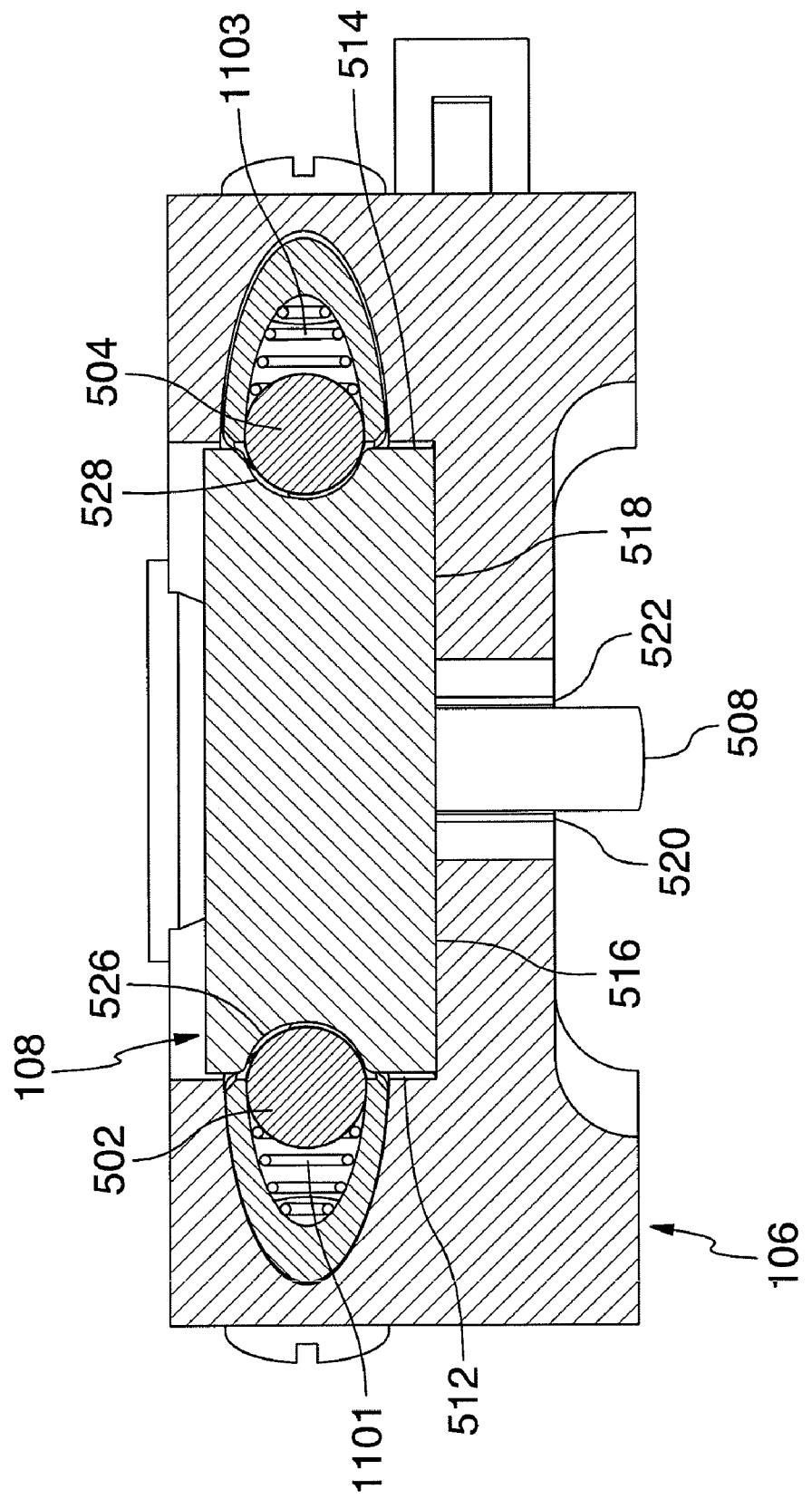
FIG. 11C is a front elevation view, cross-sectioned along lines BB-BB of FIG. 6, of the electronic lock shown in FIG. 6, wherein the male connector has been engaged in the female connector.
Figure 13:
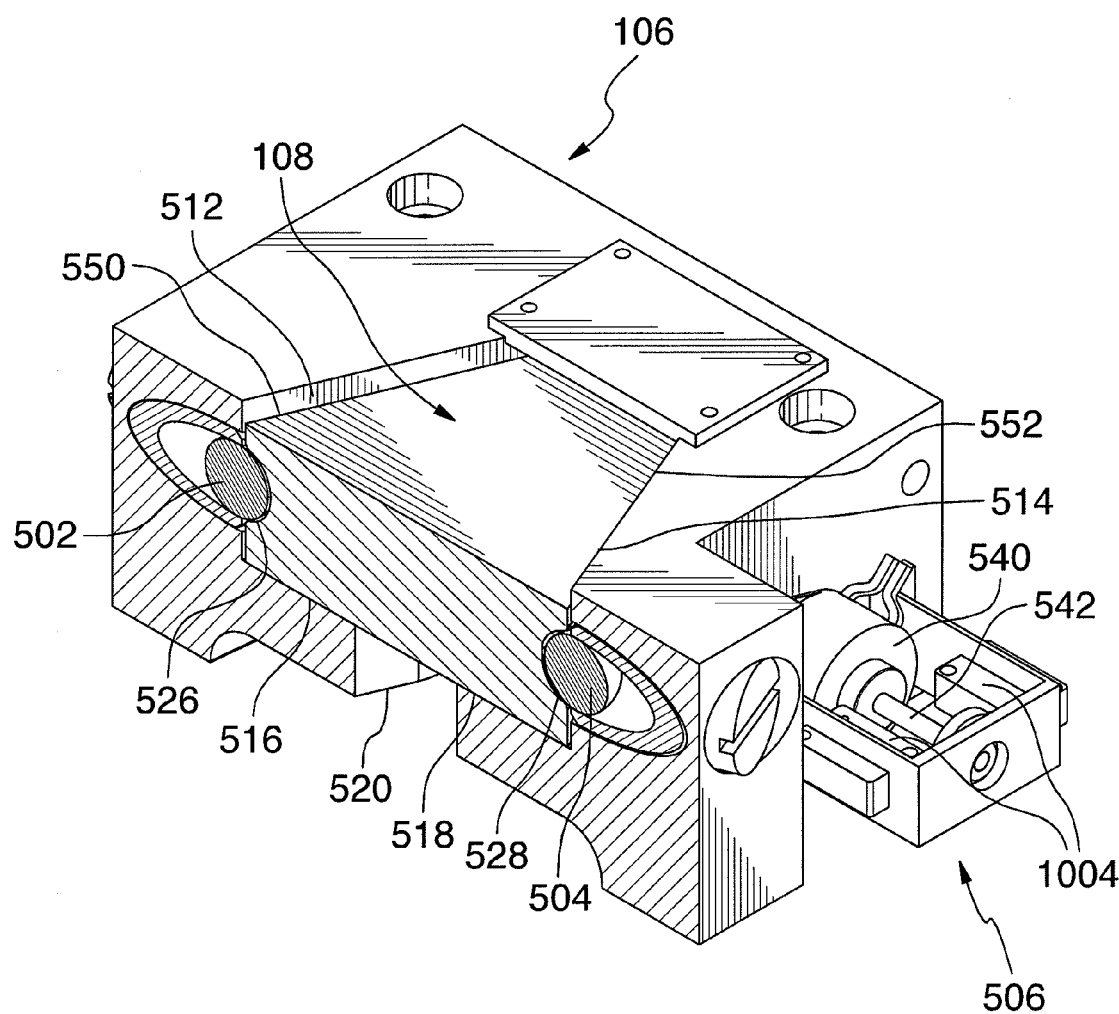
FIG. 13 is a front perspective view, cross-sectioned along lines BB-BB of FIG. 6, of the electronic lock shown in FIG. 6.
Figure 14:
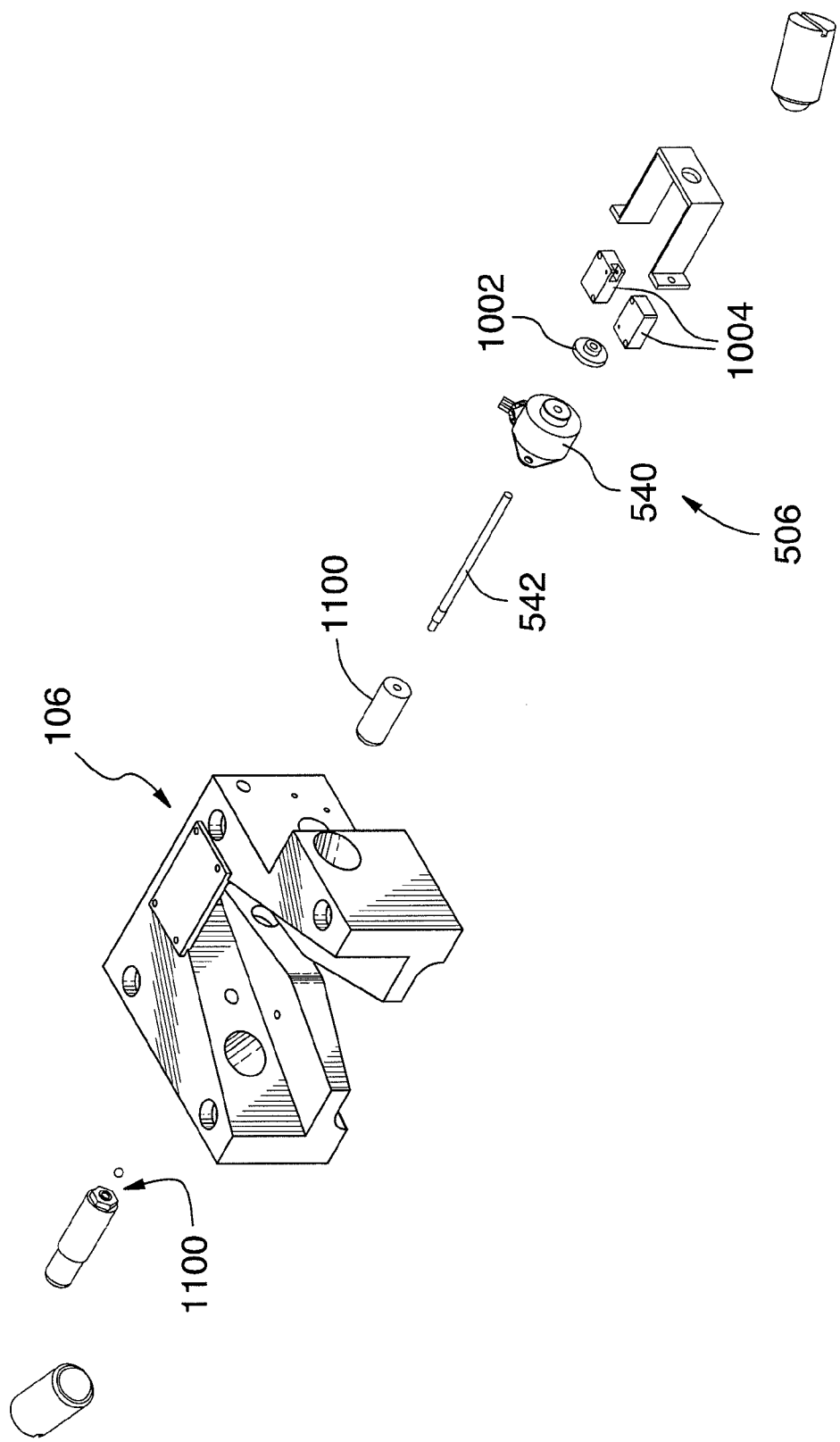
FIG. 14 is an exploded view of an embodiment of the female connector of the electronic lock for removably securing a movable item to a structure.

Now referring to FIGS. 11C and 13, in the illustrated embodiment, each of the opposed biased elements 502, 504 comprises a ball and a ball spring 1101, 1103 mounted to a ball housing. Each of the receiving recesses 526, 528 comprises a corresponding spherical portion, the spherical portion having a diameter substantially similar to the ball associated thereto. This configuration enables each of the balls to snuggly fit into their respective corresponding recess.

It will be appreciated that any other holding means allowing to temporarily retain the male connector 108 into the female connector 106 may be considered.

In one embodiment, this above described configuration further enables a movable item to be temporarily attached to a structure in a "reduced load" design. For instance, according to one configuration, the movable item may be engaged in the structure in a lockable position wherein the movable item does not rest on a lower surface. In such a configuration, the movable item may be temporarily retained in the lockable position using the holding means until the movable item is secured to the structure.

Now referring back to FIGS. 5A and 5B, in one embodiment, the securing assembly further comprises position detecting means mounted to the female connector 106 for detecting a positioning of the male connector 108 and the female connector 106 in the lockable position.

More specifically, in one embodiment, the position detecting means may be adapted for detecting a positioning of the locking finger 508 in the finger channel 515.

According to one configuration, the position detecting means may comprise a contact detector (not shown) operatively mounted to the back wall 513 proximate the finger channel 515. The position detecting means may be activated when the front tapered portion 503 of the male connector 108 is moved forwardly into the recess 511 of the female connector 106 and the locking finger contacts the contact detector when engaging the finger channel 515.

In an alternative embodiment, the position detecting means may comprise a magnetic proximity detector operatively mounted into the back wall 513 proximate the finger channel 515. In such an embodiment, the locking finger 508 is provided with a magnet element (not shown) mounted therein. The position detecting means will be activated when the front tapered portion 503 of the male connector 108 is moved forwardly into the recess 511 of the female connector 106 and the magnetic proximity detector detects the presence of the magnet in the finger channel 515.

This configuration advantageously prevents the activation of the position detecting means when an object other than a corresponding male connector is engaged in the female connector.

In one embodiment, the detection of the male connector and the female connector in the lockable position is operatively coupled to an indicator for indicating the positioning of the male connector and the female connector in the lockable position to a user of the electronic lock. The indicator may be a visual indicator such as a LED or the like; alternatively, the indicator may be an audio indicator such as a speaker or the like.

In one embodiment, the position detecting means are operatively coupled to the electronic control means. In such an embodiment, the electronic control means are adapted for selectively actuating the actuator to move the movable locking finger 1000 from the unlocked position to the locked position upon detection of the positioning of the male connector 108 and the female connector 106 in the lockable position.

In another embodiment, the securing assembly 506 further comprises an identification tag (not shown) associated with the bicycle and an identification tag reader (not shown) for identifying the identification tag and the associated bicycle when the male connector and the female connector are engaged in the lockable position.

This configuration is of great advantage to enable a monitoring of the use of each of the bicycles. It may also be of great advantage in another application wherein a large number of items are temporarily stored and retrieved at a later time, for instance for identifying vehicles secured to racks in a warehouse.

In a further embodiment, the electronic control means are operatively coupled to both position detecting means and identifying means. In such an embodiment, the electronic control means are adapted for selectively actuating the actuator to move the movable locking member from the unlocked position to the locked position upon two conditions, a first condition being a detection of the positioning of the male connector and the female connector in the lockable position, a second condition being an identification of the associated bicycle.

In one embodiment, the identification tag comprises an RFID tag and the identification reader comprises an RFID reader mounted to the bicycle rack. This configuration is of great advantage since no electric wire between the tag and the reader is needed. The skilled addressee will appreciate that other arrangements may be considered. For example, a first and a second corresponding electric connector may be provided on each connector respectively. In this case, when the male connector engages the female connector, the two electric connectors engage together to obtain the identification information. The use of RFID technology is nevertheless preferred over the use of conventional electric connectors since it may help reduce breaking of the system.

It will be appreciated that this configuration is of great advantage in a bicycle rental system. Indeed, in such a system, the electronic lock detects the engagement of a rented bicycle being returned by a user into the bicycle rack and identifies the bicycle before securing the bicycle to the bicycle rack and charging a fee to the user according to given parameters.

Figure 15:
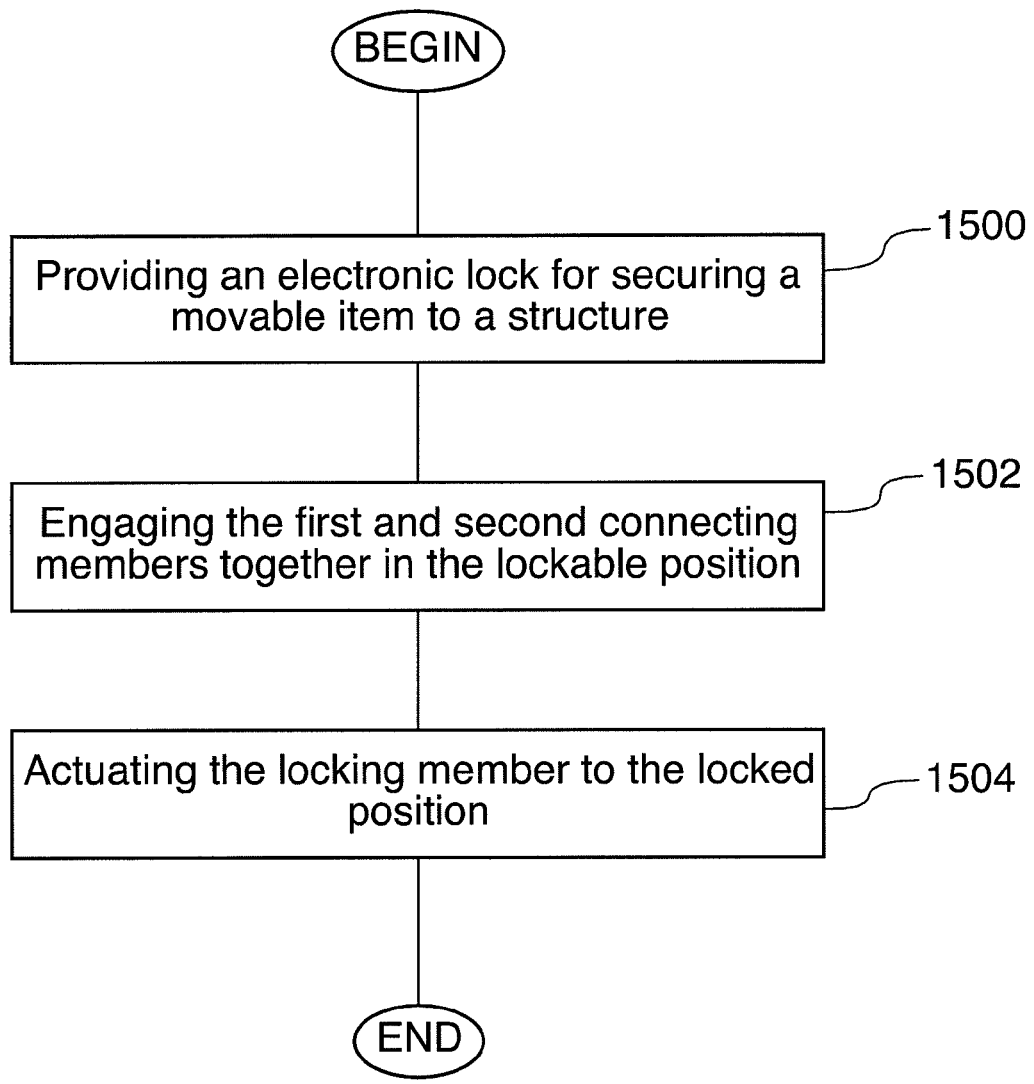
FIG. 15 is a flow chart of a method for removably securing a movable item to a structure, in accordance with one embodiment.

A method for securing a bicycle to a bicycle rack will now be described in accordance with one embodiment, with reference to FIG. 15.

According to step 1500, an electronic lock as previously described is provided, the electronic lock being mounted to a bicycle rack. In one embodiment, the electronic lock comprises a male connector mounted to the bicycle and a female connector mounted to the bicycle rack, the male connector and the female connector being engageable together in a lockable position.

In one embodiment, the electronic lock further comprises a securing assembly for securing the male connector and the female connector together when engaged in the lockable position. In one embodiment, the securing assembly comprises a movable locking member operatively associated to the female connector and a locking aperture defined in the second connecting member, the locking aperture being adapted for receiving the movable locking member when the connecting members are engaged together in the lockable position.

In one embodiment, the securing assembly further comprises an actuator operatively coupled to the movable locking member for actuating the movable locking member between an unlocked position enabling disengagement of the male connector and the female connector and a locked position wherein the movable locking member engages the locking aperture.

According to step 1502, the male connector and the female connector are engaged together in the lockable position.

According to step 1504, the movable locking member is actuated to the locked position, thereby securing the bicycle to the bicycle rack.

Figure 16:
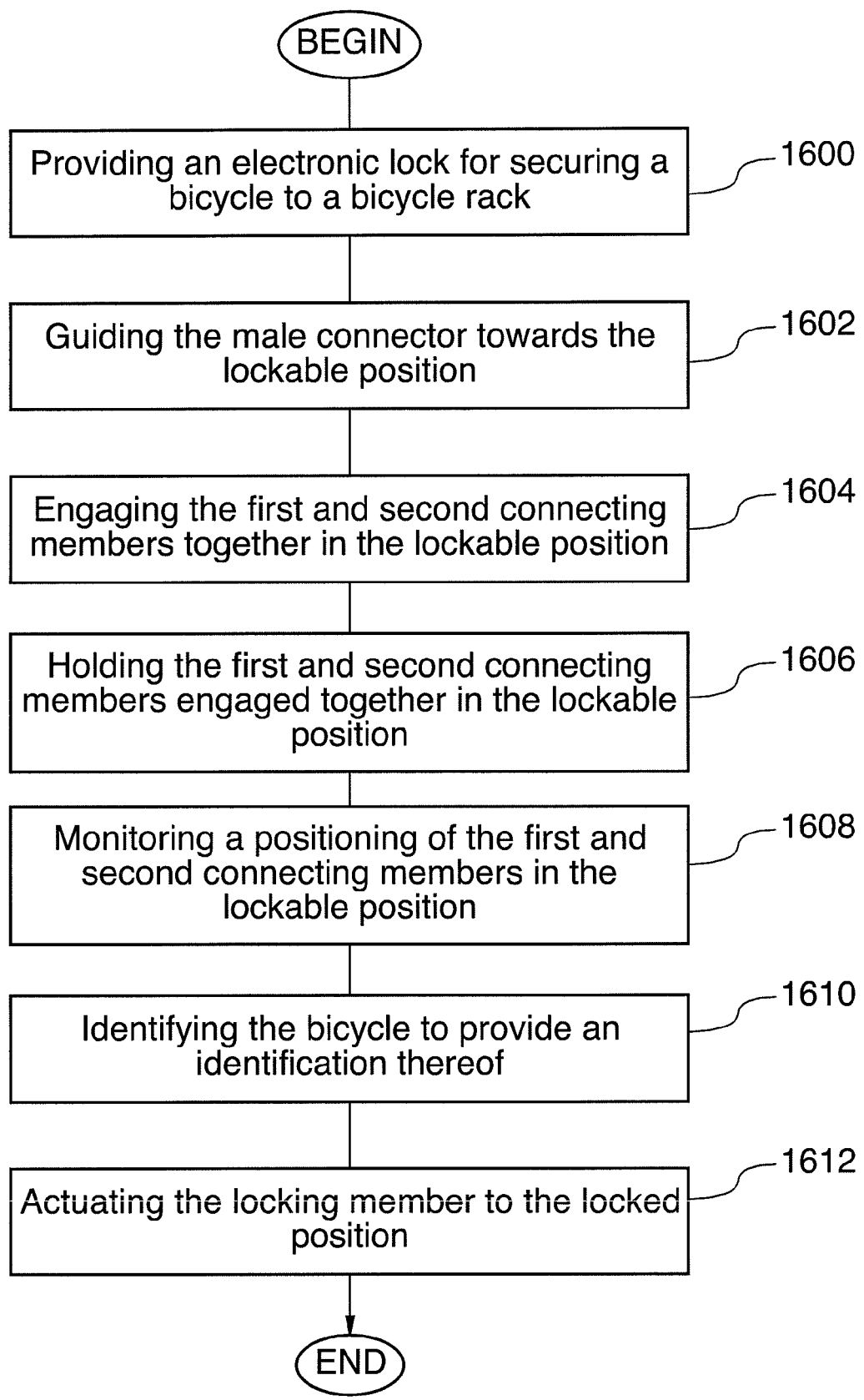
FIG. 16 is a flow chart of a method for removably securing a movable item to a structure, in accordance with another embodiment.

Another method for securing a bicycle to a bicycle rack will now be described in accordance with another embodiment, with reference to FIG. 16.

According to step 1600, an electronic lock is provided, the electronic lock being mounted to a bicycle rack. In one embodiment, the electronic lock comprises a male connector mounted to the bicycle and a female connector mounted to the bicycle rack, the male connector and the female connector being engageable together in a lockable position.

According to step 1602, in one embodiment, a user then guides the male connector of the bicycle to be secured into the female connector towards the lockable position.

According to step 1604, the male connector and the female connector are then engaged together in the lockable position.

According to step 1606, in one embodiment, the first and second connecting members are then held engaged together in the lockable position.

According to step 1608, in one embodiment, a positioning of the male connector and the female connector in the lockable position is then monitored.

According to step 1610, in one embodiment, the bicycle is identified to provide an identification thereof.

According to step 1612, the movable locking member is actuated to the locked position, thereby securing the bicycle to the bicycle rack.

There is also provided a kit for removably securing a bicycle to a bicycle rack. In this embodiment, the male connector is not yet mounted on the bicycle, but is mountable thereto. Similarly, the female connector is not yet mounted to the bicycle rack, but is mountable thereto.

The skilled addressee will appreciate that, in one embodiment, it may be envisaged to mount the female connector to the bicycle and the male connector to the bicycle rack.

Furthermore, providing the male connector and the female connector separately may also be contemplated by the skilled addressee.

The skilled addressee will appreciate that, in one embodiment, the movable locking member, the actuator and the electronic control means may be associated with the connecting member mounted to the movable item.

The skilled addressee will also appreciate that other configurations for the first and second complementary cooperating connecting members may be considered. For instance, the first connecting member may comprise a male connector and the second connecting member may comprise a female connector.

One skilled in the art will further appreciate that the electronic lock herein described may be used in other applications. In an alternative embodiment, the movable item may comprise a boat and the structure a docking wharf. In another embodiment, the movable item may comprise a stroller and the structure a stroller renting station located in a mall.

In yet another embodiment, the structure may not be part of a bicycle rental station. In such an embodiment, the structure may instead comprise a bicycle rack owned by a user. Alternatively, in a city area, the structure may be a fence or a house wall. This configuration advantageously enables a user owning a movable item, such as a bicycle, to removably secure the movable item to a structure owned by the same user.

The skilled addressee will appreciate that other arrangements for the movable locking member may be considered. Indeed, in the present description the locking member has been described as being translatable but one may envisaged an alternative embodiment wherein the movable locking member would be rotatable between the locked and the unlocked position.

Although the above description relates to specific preferred embodiments as presently contemplated by the inventor, it will be understood that the invention in its broad aspect includes mechanical and functional equivalents of the elements described herein.

The invention claimed is:

1. An electronic locking system for removably securing a bicycle to a structure, the electronic locking system comprising:
   first and second complementary cooperating connecting members, each being fixedly mounted to a respective one of the bicycle and the structure and being engageable together in a lockable position; and
   a securing assembly for securing said first and second connecting members together when engaged in the lockable position, said securing assembly comprising:
      a movable locking member operatively associated to the first connecting member;
      a locking aperture defined in the second connecting member, said locking aperture being adapted for receiving the movable locking member when the connecting members are engaged together in the lockable position, wherein the movable locking member, when in said unlocked position, is in a retracted position, thereby allowing a clear channel for moving the bicycle into the locking position with the structure;
      an actuator operatively coupled to the movable locking member for actuating the movable locking member between an unlocked position enabling disengagement of the first and second connecting members and a locked position wherein the movable locking member protrudes from the retracted position to engage the locking aperture;
      position detecting means mounted to one of said first and second connecting members for detecting a positioning of said first and second connecting members in said lockable position; and
      electronic control means operatively coupled to the actuator for controlling selective actuation of the movable locking member from the unlocked position to the locked position and from the locked position to the unlocked position when the connecting members are engaged together in the lockable position,
      wherein said electronic control means is adapted to selectively actuate said actuator to move said movable locking member from said unlocked position to said locked position upon detection by the position detecting means of said positioning of said first and second connecting member in said lockable position.

2. The electronic locking system as claimed in claim 1, wherein said electronic control means are operatively coupled to the actuator for urging activation of the actuator, thereby causing the movable locking member to be selectively actuated from the unlocked position to the locked position and from the locked position to the unlocked position.

3. The electronic locking system as claimed in claim 1, wherein said first connecting member comprises a female connector mounted to said structure and said second connecting member comprises a corresponding complementary male connector mounted to said bicycle.

4. The electronic locking system as claimed in claim 1, wherein said second connecting member comprises a male connector having a front tapered portion, said tapered portion comprising two opposed side surfaces converging towards each other and a bottom surface, said first connecting member comprising a female connector having a recess adapted for receiving said front tapered portion therein, said recess comprising a corresponding tapered portion having two opposed inner side walls converging towards each other and two opposed sitting members projecting inwards said recess and adapted for slidably receiving thereon said tapered portion of said male connector.

5. The electronic locking system as claimed in claim 4, wherein each of said two opposed side surfaces and said bottom surface of said front tapered portion of said male connector comprises a planar surface.

6. The electronic locking system as claimed in claim 4, wherein the two opposed side surfaces of the front tapered portion of the male connector define a V-shape and the corresponding inner side walls of the tapered portion of the recess of the female connector define a complementary V-shape adapted to snuggly receive the front tapered portion of the male connector.

7. The electronic locking system as claimed in claim 4, wherein each of said two opposed side surfaces of the front tapered portion of the male connector comprises a substantially vertical planar surface and each of said two opposed inner side walls of the tapered portion of the recess of the female connector comprises a substantially vertical planar surface.

8. The electronic locking system as claimed in claim 4, wherein said second connecting member comprises a locking finger extending downwardly from the front tapered portion, said locking aperture being provided on said locking finger.

9. The electronic locking system as claimed in claim 8, wherein said recess of said female connector further comprises two opposed lower inner side walls converging towards each other and defining a finger channel adapted for receiving the locking finger therein.

10. The electronic locking system as claimed in claim 4, wherein said male connector further comprises a hinge extending between the front tapered portion and a back portion, said hinge enabling a jointed coupling therebetween.

11. The electronic locking system as claimed in claim 1, further comprising holding means adapted for cooperating with each of the connecting members for temporarily holding said connecting members together in said lockable position once engaged therein.

12. The electronic locking system as claimed in claim 11, wherein said holding means comprise a pair of two opposed biased elements mounted to a respective one of said first and second connecting members, each of said biased elements having a resting position wherein said element is urged outwardly and protrudes from the corresponding connecting member, said holding means further comprising a pair of corresponding cooperating opposed receiving recesses mounted to the remaining connecting member, each of said receiving recesses being adapted to receive therein a corresponding biased element when said first and second connecting members are engaged in said lockable position, thereby holding said connecting members together in said lockable position.

13. The electronic locking system as claimed in claim 12, wherein each of said biased elements comprises a ball and a ball spring mounted in a ball housing, each of said receiving recesses comprising a corresponding spherical portion.

14. The electronic locking system as claimed in claim 12, wherein each of said biased elements is mounted on the connecting member mounted to the structure and each of the receiving recesses is mounted on the connecting member mounted to the bicycle.

15. The electronic locking system as claimed in claim 14, wherein the connecting member mounted to the structure comprises a female connector and the connecting member mounted to the bicycle comprises a male connector.

16. The electronic locking system as claimed in claim 1, wherein said securing assembly further comprises:
   an identification tag associated with said bicycle; and
   an identification reader for identifying said identification tag and said associated bicycle when said first and second connectors are engaged in said lockable position.

17. The electronic locking system as claimed in claim 16, wherein said electronic control means is adapted for selectively actuating said actuator to move said movable locking member from said unlocked position to said locked position upon detection of said positioning of said first and second connecting members in said lockable position and identification of the associated bicycle.

18. The electronic locking system as claimed in claim 16, wherein said identification tag comprises an RFID tag and said identification reader comprises an RFID reader mounted to said structure.

19. The electronic locking system as claimed in claim 1, wherein said electronic control means comprise unsecuring means for enabling an actuating of the movable locking member from the locked position to the unlocked position, said unsecuring means being selected from a group consisting of a card reader adapted for receiving a corresponding user card, a keypad adapted for receiving a user code and a bar code reader adapted for reading a corresponding bar code.

20. The electronic locking system as claimed in claim 1, wherein said movable locking member comprises an elongated member axially translatable between said unlocked position and said locked position, said locking member being engaged at both ends in said first connecting member through said locking aperture when in said locked position.

21. The electronic locking system as claimed in claim 20, wherein said actuator comprises a motor and a shaft driven by said motor, said shaft being attached to the movable locking member for driving said movable locking member between said unlocked position and said locked position.

22. The electronic locking system as claimed in claim 21, wherein said securing assembly further comprises shaft position detecting means for monitoring a position of the shaft to thereby monitor a position of the movable locking member.

23. The electronic locking system as claimed in claim 22, wherein said shaft position detecting means comprise an optical detector and a mechanical detector, each of said detector being adapted for detecting the position of the shaft and an associated position of the movable locking member in said locked position.

24. The electronic locking system as claimed in claim 1, wherein said structure comprises a bicycle rack.

25. The electronic locking system as claimed in claim 24, wherein said bicycle rack is a part of a bicycle rental station.

26. The electronic locking system as claimed in claim 24, wherein said connecting member mounted on said bicycle comprises attaching means for fixedly attaching said connecting member to a fork of said bicycle.

27. The electronic locking system as claimed in claim 26, wherein said attaching means comprise a pair of cylindrical holes extending through said connecting member mounted on said bicycle, said pair of cylindrical holes being adapted to fixedly receive said fork of said bicycle therein.

28. An electronic locking system for removably securing a bicycle to a structure, the electronic locking system comprising:
   an elongated male connector fixedly mounted to the bicycle and comprising a locking aperture;
   a female connector fixedly mounted to the structure and adapted for removably receiving therein the elongated male connector;
   a securing assembly associated to the female connector, the securing assembly comprising:
      a movable locking member displaceable between an unlocked position for allowing the female connector to receive therein the elongated male connector and a locked position, wherein the movable locking member, when in said unlocked position, is in a retracted position, thereby allowing a clear channel for moving the bicycle into the locking position with the structure;
      an actuator for causing displacement of the locking member between the unlocked position and the locked position;
      position detecting means mounted to one of said bicycle to a structure for detecting a positioning of said first and second connecting members in said lockable position; and
      electronic control means coupled to the actuator for controlling displacement of the locking member between the unlocked position and the locked position;
      wherein when the elongated male connector is received in the female connector, the electronic control means controls the actuator for causing the locking member to displace towards the locked position and to engage the locking aperture, thereby securing the elongated male connector in the female connector;
      wherein said electronic control means is adapted to selectively actuate said actuator to displace said movable locking member from said unlocked position to said locked position upon detection by the position detecting means of said positioning of said first and second connecting member in said lockable position.

29. A method for removably securing a bicycle to a structure, the method comprising:
providing an electronic locking system for removably securing the bicycle to the structure, the electronic locking system comprising:
first and second complementary cooperating connecting members, each being fixedly mounted to a respective one of the bicycle and the structure and being engageable together in a lockable position; and
a securing assembly for securing said first and second connecting members together when engaged in the lockable position, said securing assembly comprising:
a movable locking member operatively associated to the first connecting member, wherein the movable locking member, when in an unlocked position, is in a retracted position, thereby allowing a clear channel for moving the bicycle into the lockable position with the structure;
a locking aperture defined in the second connecting member, said locking aperture being adapted for receiving the movable locking member when the connecting members are engaged together in the lockable position;
an actuator operatively coupled to the movable locking member for actuating the movable locking member between the unlocked position enabling disengagement of the first and second connecting members and a locked position wherein the movable locking member engages the locking aperture; and
electronic control means operatively coupled to the actuator for controlling selective actuation of the movable locking member from the unlocked position to the locked position and from the locked position to the unlocked position when the connecting members are engaged together in the lockable position;
monitoring a positioning of said first and second connecting members in said lockable position;
engaging the first and second connecting members together in the lockable position; and
upon detection of said positioning of said first and second connecting members in said lockable position, actuating the locking member to the locked position so that the locking member engages the locking aperture, thereby securing said bicycle to said structure.

30. The method as claimed in claim 29, further comprising identifying said bicycle before actuating the locking member.

31. The method as claimed in claim 29, wherein said engaging of the first and second connecting members together in the lockable position comprises guiding said connecting member mounted to said bicycle towards said lockable position.

32. The method as claimed in claim 29, wherein said engaging of the first and second connecting members together in the lockable position comprises holding said first and second connecting members engaged in said lockable position.

33. The method as claimed in claim 29, further comprising, before actuating said locking member:
identifying said bicycle to provide an identification thereof;
wherein, in said actuating, the locking member is actuated to the locked position upon detection of said positioning of said first and second connecting members in said lockable position and said identification of said bicycle.

34. The method as claimed in claim 33, wherein said identifying comprises a radio-frequency identification.

35. The method as claimed in claim 29, further comprising:
requesting a user identification; and
actuating the locking member to the unlocked position for unsecuring said bicycle upon reception of said user identification.

36. The method as claimed in claim 29, wherein said structure comprises a bicycle rack.

37. A kit for removably securing a bicycle to a structure, the kit comprising:
first and second complementary cooperating connecting members, each being fixedly mountable to a respective one of the bicycle and the structure and being engageable together in a lockable position; and
a securing assembly for securing said first and second connecting members together when engaged in the lockable position, said securing assembly comprising:
a movable locking member operatively associatable to the first connecting member;
a locking aperture defined in the second connecting member, said locking aperture being adapted for receiving the movable locking member when the connecting members are engaged together in the lockable position, wherein the movable locking member, when in said unlocked position, is in a retracted position, thereby allowing a clear channel for moving the bicycle into the locking position with the structure;
an actuator operatively couplable to the movable locking member for actuating the movable locking member between an unlocked position enabling disengagement of the first and second connecting members and a locked position wherein the movable locking member protrudes from the retracted position to engage the locking aperture;
position detecting means mounted to one of said first and second connecting members for detecting a positioning of said first and second connecting members in said lockable position; and
electronic control means operatively couplable to the actuator for controlling selective actuation of the movable locking member from the unlocked position to the locked position and from the locked position to the unlocked position when the connecting members are engaged together in the lockable position;
wherein said electronic control means is adapted to selectively actuate said actuator to move said movable locking member from said unlocked position to said locked position upon detection by the position detecting means of said positioning of said first and second connecting member in said lockable position.

* * * * *